Dec. 9, 1958  G. LONG ET AL  2,863,375
AUTOMATIC PUFFING GUN
Filed Jan. 25, 1952  11 Sheets-Sheet 1
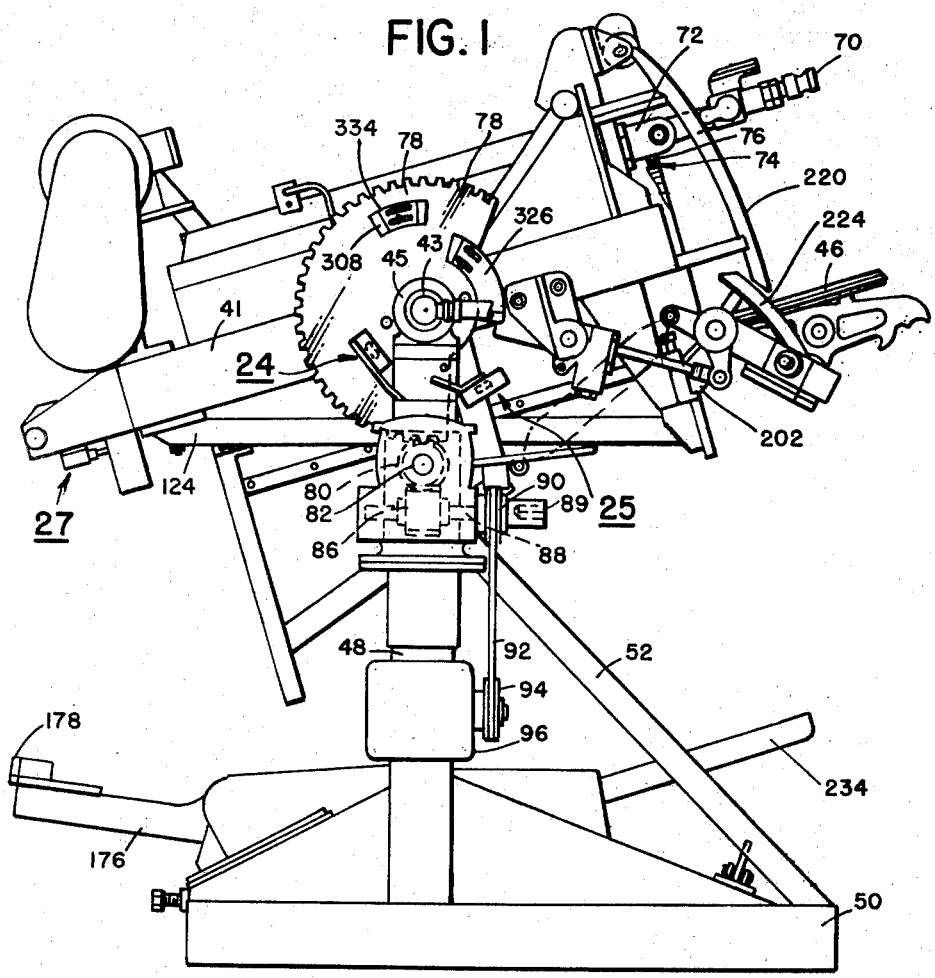
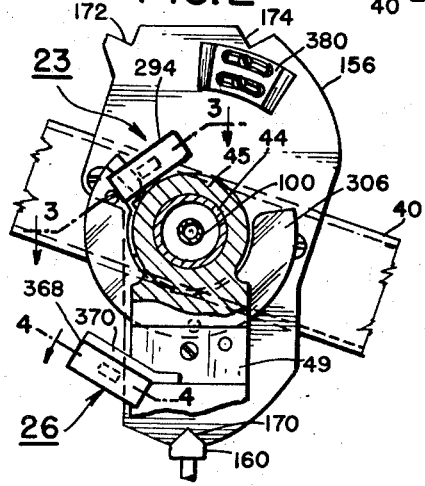
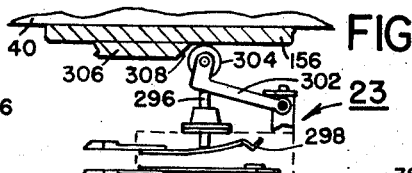
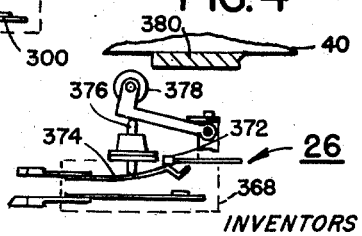
INVENTORS
GEORGE LONG
JOSEPH J. VON EDESKUTY
BY William C. Strieber ATTORNEY

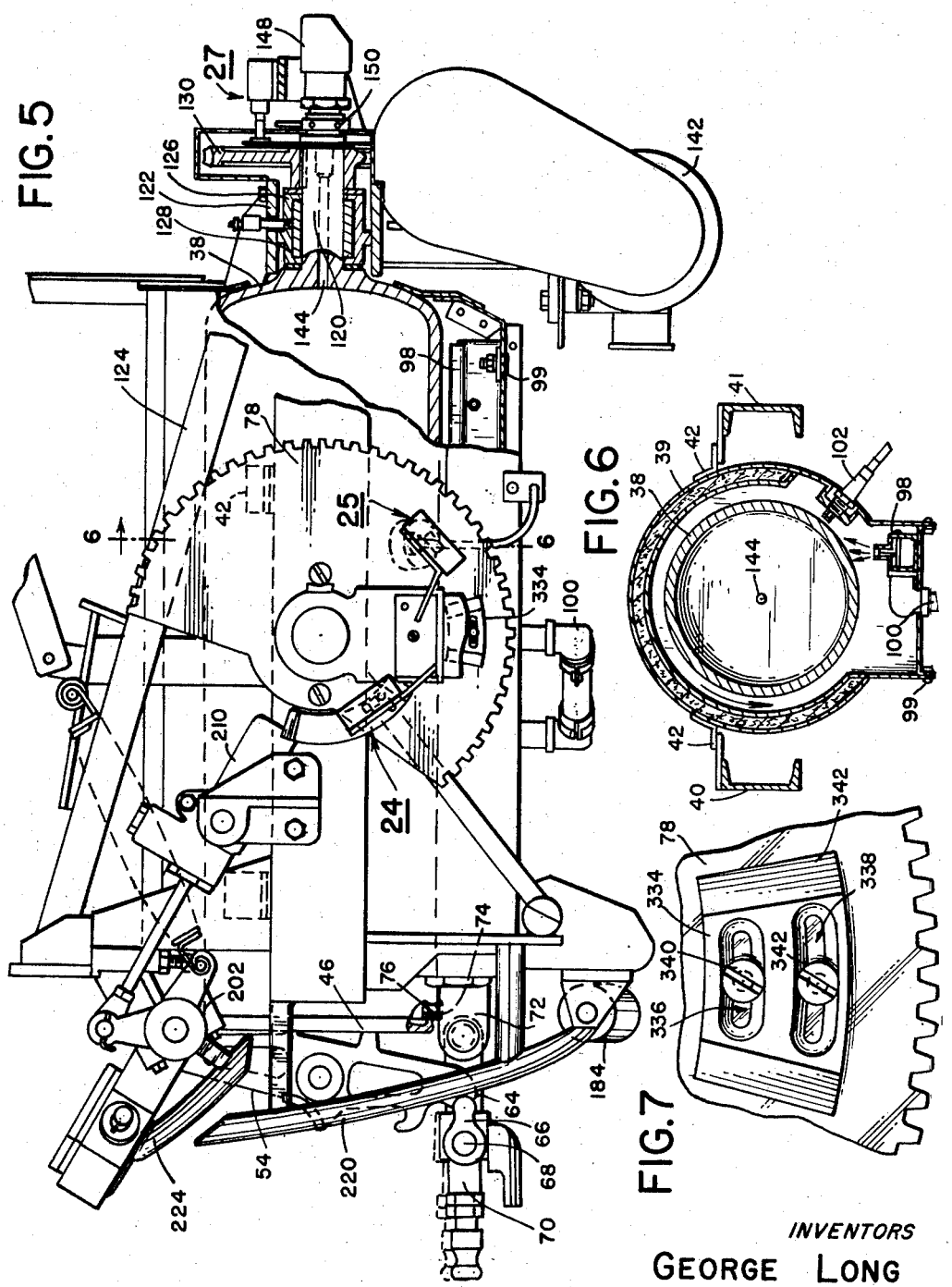

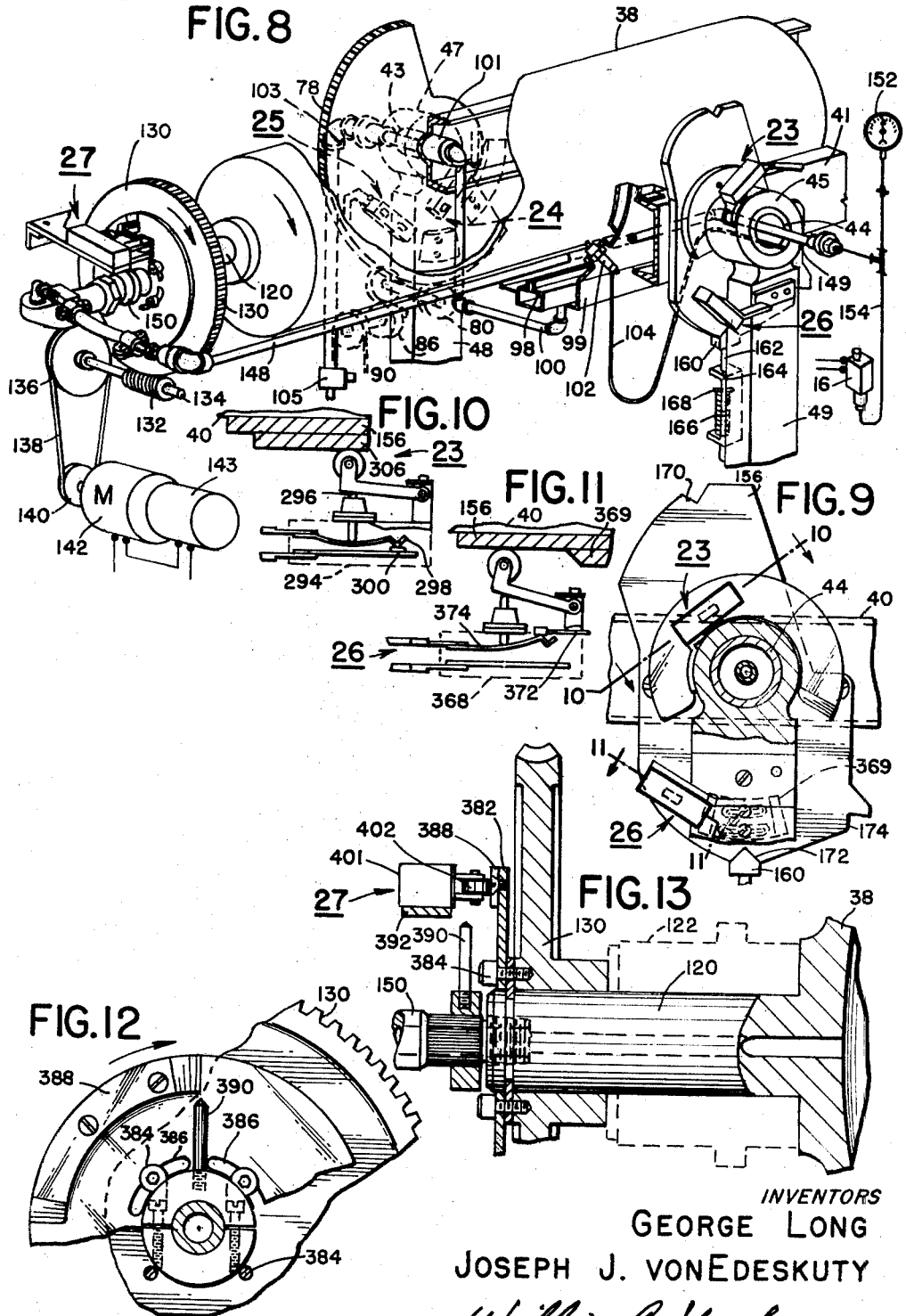

Dec. 9, 1958

G. LONG ET AL 2,863,375

AUTOMATIC PUFFING GUN

Filed Jan. 25, 1952

INVENTORS
GEORGE LONG
JOSEPH J. VON EDESKUTY
BY William C. Stueber ATTORNEY

Dec. 9, 1958
G. LONG ET AL
2,863,375
AUTOMATIC PUFFING GUN
Filed Jan. 25, 1952
11 Sheets-Sheet 5
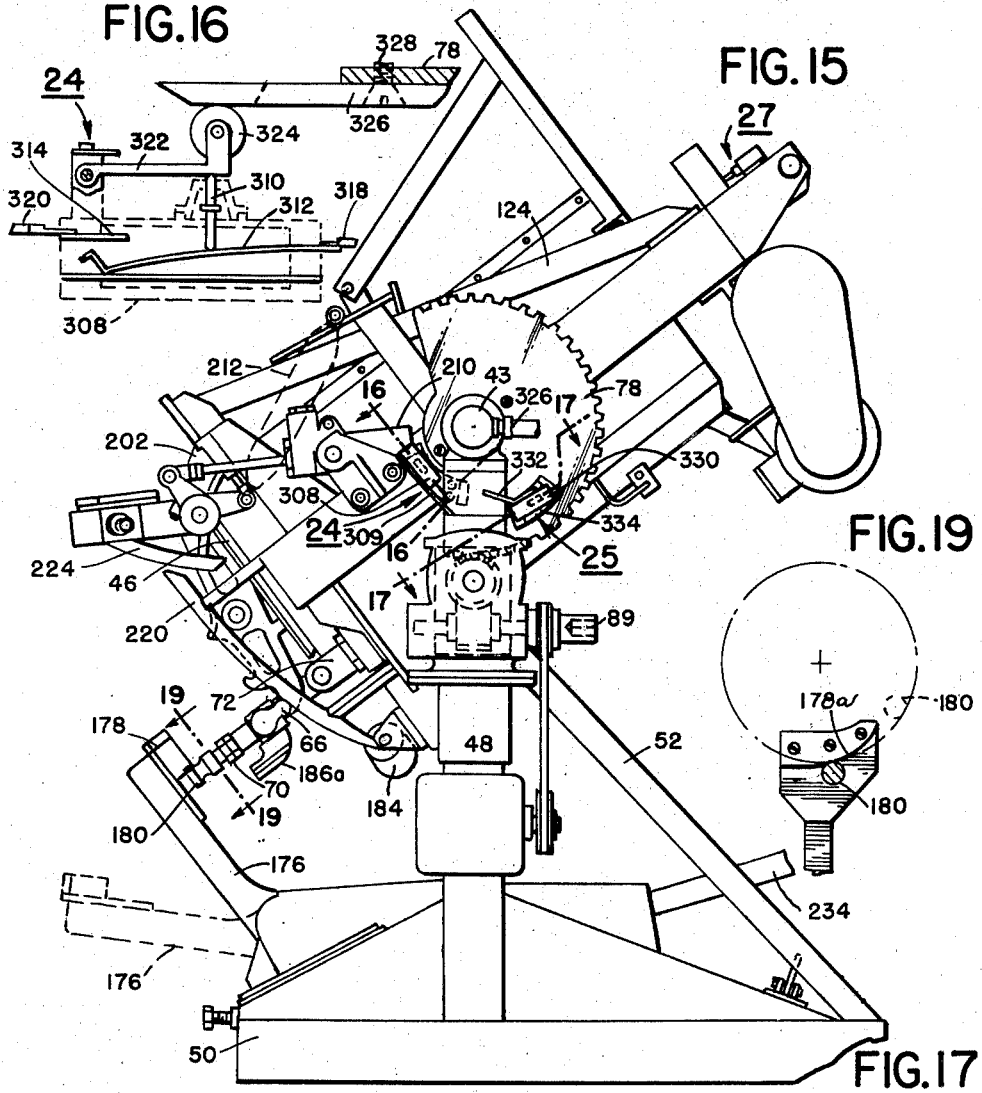
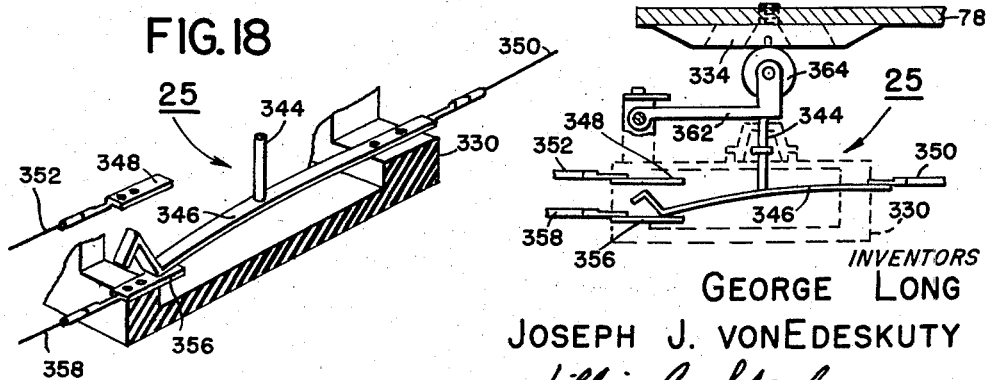
INVENTORS
GEORGE LONG
JOSEPH J. vonEDESKUTY
By William C. Stueber ATTORNEY Dec. 9, 1958

G. LONG ET AL 2,863,375

AUTOMATIC PUFFING GUN

Filed Jan. 25, 1952

INVENTORS
GEORGE LONG
JOSEPH J. VON EDESKUTY
BY *William C. Strueber* ATTORNEY

Dec. 9, 1958  G. LONG ET AL  2,863,375
AUTOMATIC PUFFING GUN
Filed Jan. 25, 1952  11 Sheets-Sheet 7
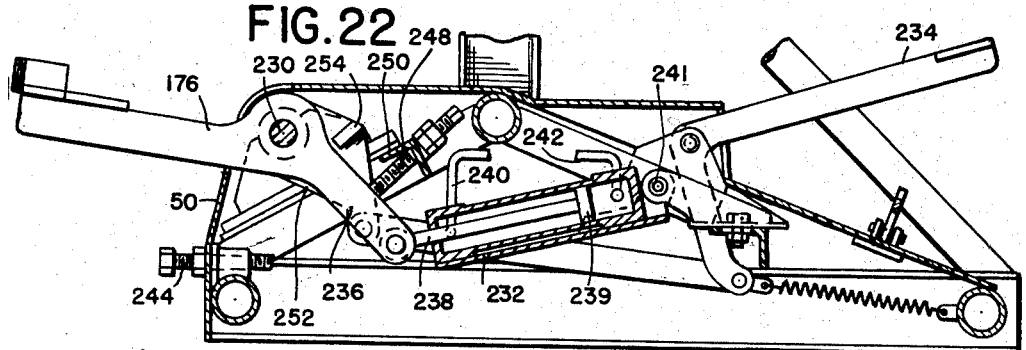
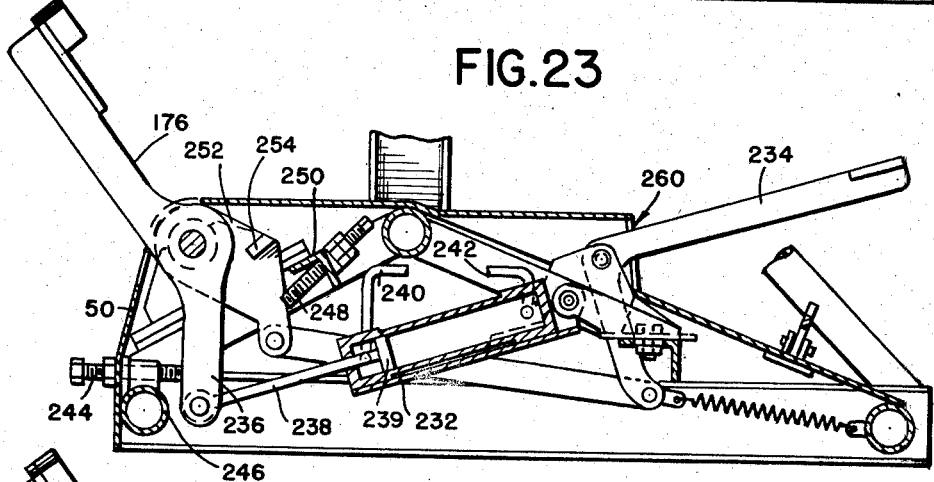
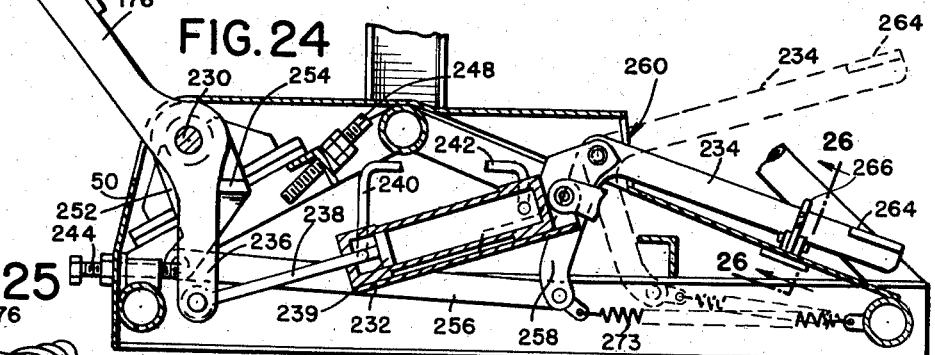
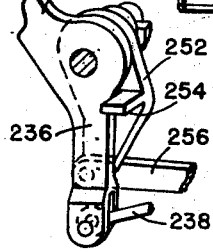
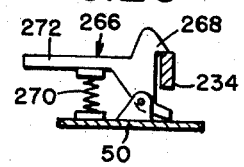
INVENTORS
GEORGE LONG
JOSEPH J. vonEDESKUTY
BY *William C. Stueber* ATTORNEY Dec. 9, 1958      G. LONG ET AL      2,863,375
AUTOMATIC PUFFING GUN
Filed Jan. 25, 1952      11 Sheets-Sheet 8
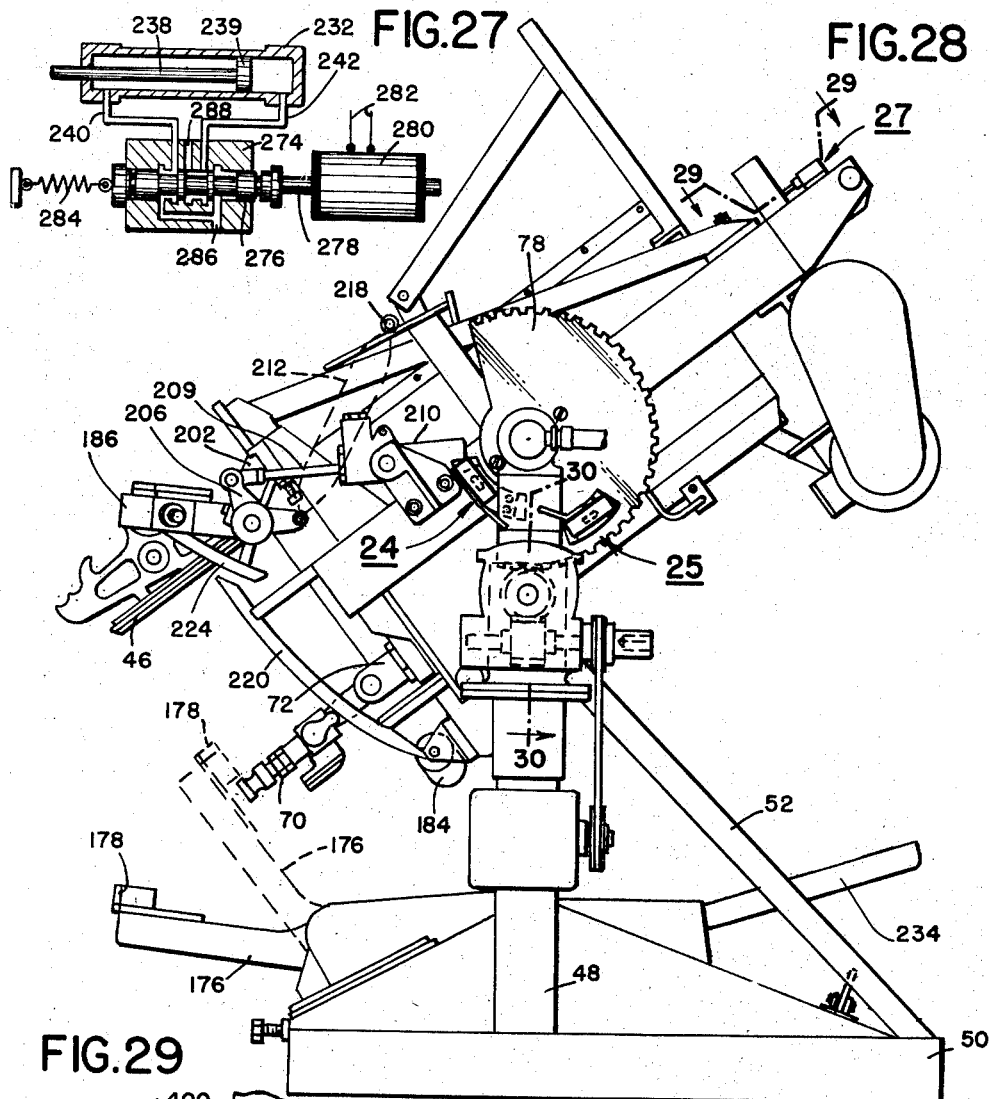
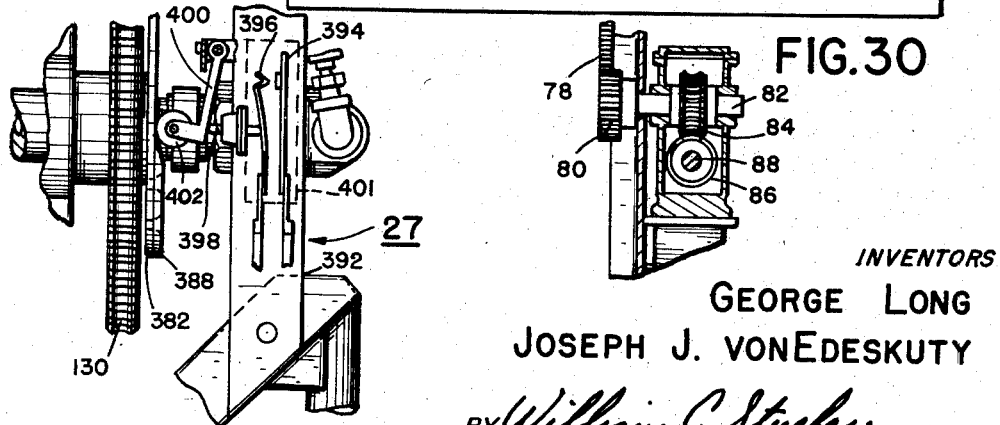
INVENTORS
GEORGE LONG
JOSEPH J. vonEDESKUTY
BY William C. Stucker ATTORNEY Dec. 9, 1958     G. LONG ET AL     2,863,375
AUTOMATIC PUFFING GUN
Filed Jan. 25, 1952     11 Sheets-Sheet 9
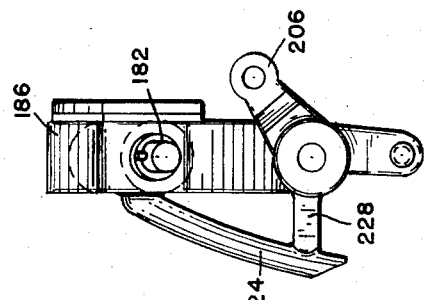
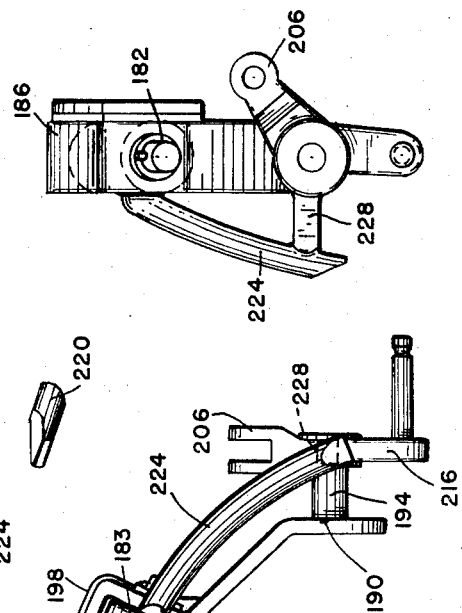
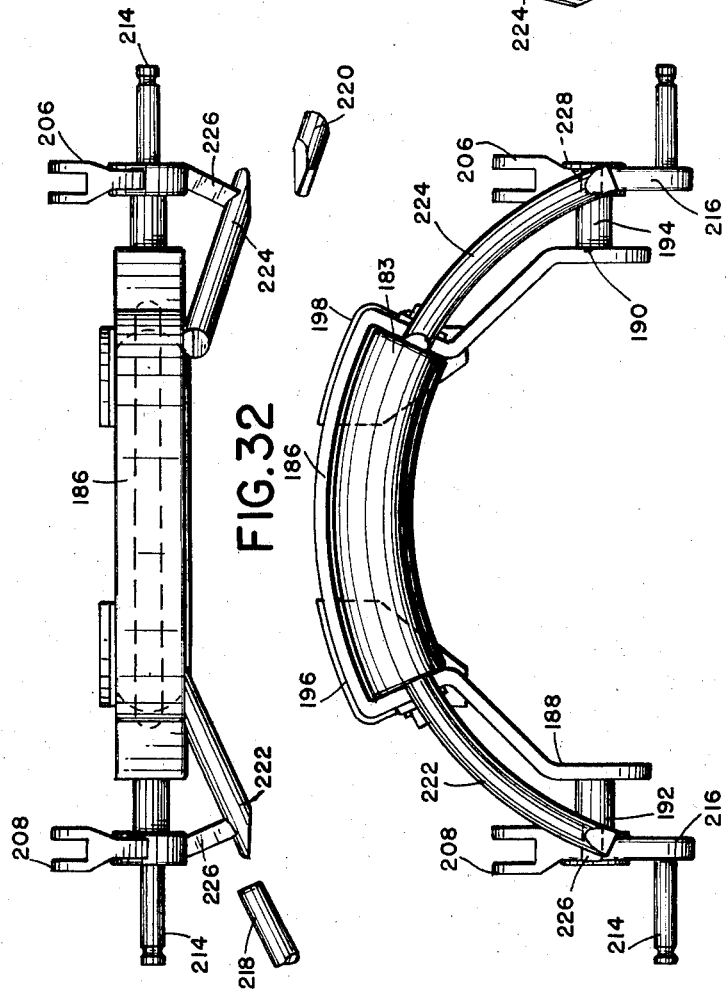
INVENTORS
GEORGE LONG
JOSEPH J. vonEDESKUTY
BY *William C. Strueber* ATTORNEY

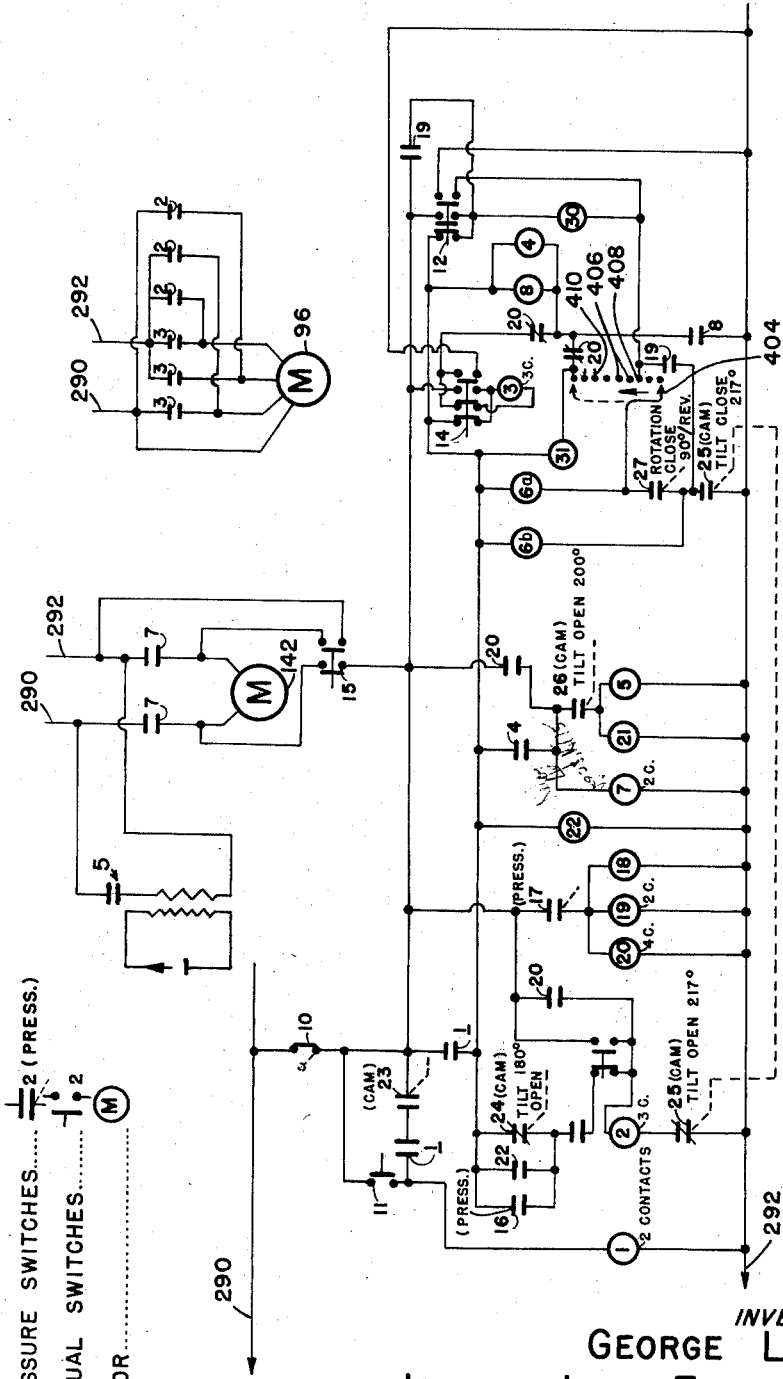

United States Patent Office 2,863,375
Patented Dec. 9, 1958

2,863,375

AUTOMATIC PUFFING GUN

George Long and Joseph J. Von Edeskuty, Minneapolis, Minn., assignors to General Mills, Inc., a corporation of Delaware Application January 25, 1952, Serial No. 268,196

24 Claims. (Cl. 99—238)

This invention relates to improved apparatus and method for the treatment of food starch products, such as breakfast cereals, by subjecting them to heat and pressure and suddenly reducing the pressure to cause an expansion of the cereal product.

In this treatment of starch products, which is referred to in the art as "puffing," material containing starch cells is placed in a closed pressure chamber and therein heated and subjected to pressure which may be created by the steam within the chamber. When the product has reached a certain temperature and pressure, the chamber is suddenly opened to atmospheric pressure to cause an expansion of the starch cells of the product which puffs or greatly enlarges its size.

If the product to be puffed is a cereal, it may be puffed in its original state as a grain or it may be ground and cooked and formed into small shaped granules. The size to which these granules are enlarged is dependent upon the type of product used, the moisture content of the product, the temperature to which the product is heated, and the pressure to which it is subjected before releasing it to atmosphere.

For the puffing of certain products, heating the product within a closed chamber by heat applied to the chamber, such as by a direct flame, has advantages over heating by steam applied within or without the chamber. Directly heating the chamber permits absolute control of moisture of the product and obtains a more rapid heating with simple equipment. With the use of higher degrees of heat, such as may be applied externally to the pressure chamber, there are dangers of heating the product unevenly which may result in burning or cause the cereal to be puffed to uneven sizes. Further, if particles of the cereal product are permitted to rest against the chamber wall and are not immediately removed from the pressure chamber after their being puffed, they will be burned from the latent heat of the chamber wall.

In the production of food products, such as breakfast cereals, from grain, it is frequently desirable that the cereal be enlarged to a certain definite size, for optimum palatability. In any event, it is generally desirable that the product be consistent in enlargement to create a product of uniform size. To obtain this it becomes necessary to have complete control over the variables of moisture, temperature and pressure. This has been made possible by our invention which uses a mechanism which is completely automatic. That is, the operation of consecutive puffing processes is performed in exactly the same manner and the control of the various steps is not left to manual operation, thus eliminating the chance of human error.

In addition to the advantage of an automatic puffing mechanism being able to eliminate the opportunity for human error, there is the obvious saving of manual labor and the consequent reduction of cost of the product produced.

Accordingly, an object of the present invention is to provide an apparatus which will operate automatically to heat a product containing starch cells, such as breakfast cereal grains, in a closed chamber, subjecting it to a high pressure, and which will further automatically operate at the proper conditions to release the grains to atmospheric pressure causing a sudden expansion of the cereals.

Another object of the invention is to provide an improved pressure chamber for puffing cereals which will insure that during firing and during emptying none of the grains will rest against the chamber wall to become burned and which will empty very rapidly to decrease the chances of burning the cereal.

Another object of the invention is to provide a cereal puffing mechanism having a closed pressure chamber with a pressure release cover in which the cereal grains are heated in a pressurized atmosphere while the chamber is rotated and in which the rotation is continued while the gun is tilted to work the cereal toward the cover and in which rotation is still continued after the gun is fired to prevent scorching or burning of the puffed cereal grains while they are being discharged from the chamber.

Another object of the invention is to design an improved cover and latch, and cover latch tripping mechanism for a puffing gun which enables unlatching of the cover while the puffing gun is being rotated.

A further object of the invention is to provide an automatic puffing gun in which cereal grains are heated under pressure and in which the grains are suddenly discharged to atmosphere by automatic means when the certain predetermined pressure is reached within the puffing gun.

A further object of the invention is to provide an automatic cereal puffing apparatus which automatically fires to vent the cereal grains to atmosphere upon obtaining a certain pressure within the puffing chamber, and which is provided with safety devices which cause the gun to fire in the event that the automatic pressure firing device becomes inoperative.

A still further object of the invention is to provide a puffing gun which rotates to tumble the cereal grains as they are being heated, and which may be either automatically fired to release the cereal grains to atmosphere, or may be manually fired while continuing rotation.

Other objects and advantages will become apparent from the following specification taken in connection with the accompanying drawings in which:

Figure 1 is a side elevation of the puffing gun showing it in the loading position;

Figure 2 is a detailed drawing taken in side elevation from the opposite side of the machine of Fig. 1 and showing the position of the switches and cams on that side of the machine;

Fig. 3 is a sectional view taken along line 3—3 of Fig. 2;

Fig. 4 is a sectional view taken along line 4—4 of Fig. 2;

Fig. 5 shows the gun tilted to the operating position where the contents are heated and the pressure is built up within the gun;

Fig. 6 is a sectional view taken through the gun along line 6—6 of Fig. 5;

Fig. 7 is an enlarged detail view showing the manner of attaching the cam plate to the gear;

Fig. 8 is a perspective view of the puffing gun mechanism having certain parts broken away to illustrate details of construction;

Fig. 9 is a detailed view taken from the right side of the puffing gun illustrating the position of the cams and the switches when the gun is in the pressurizing position of Figs. 5 and 8;

Fig. 10 is a sectional view taken along line 10—10 of

Figure 14:
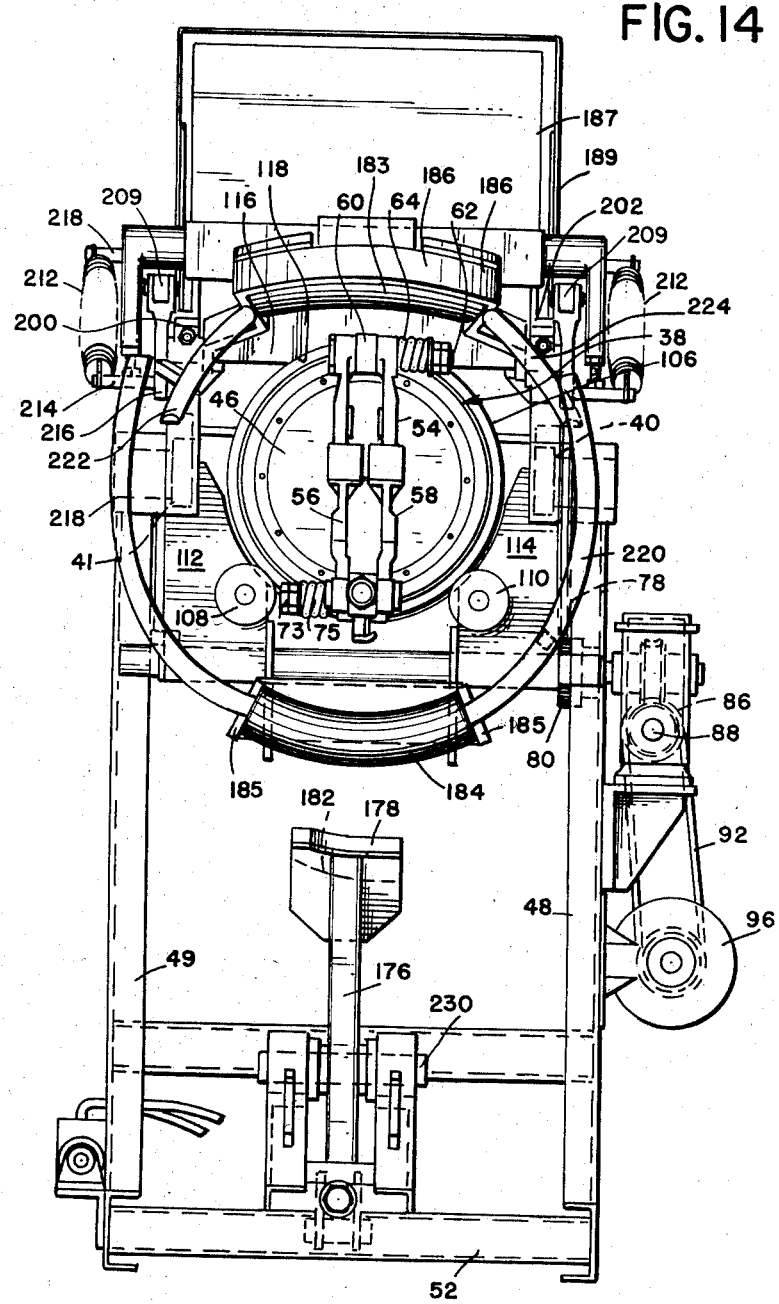
Figure 20:
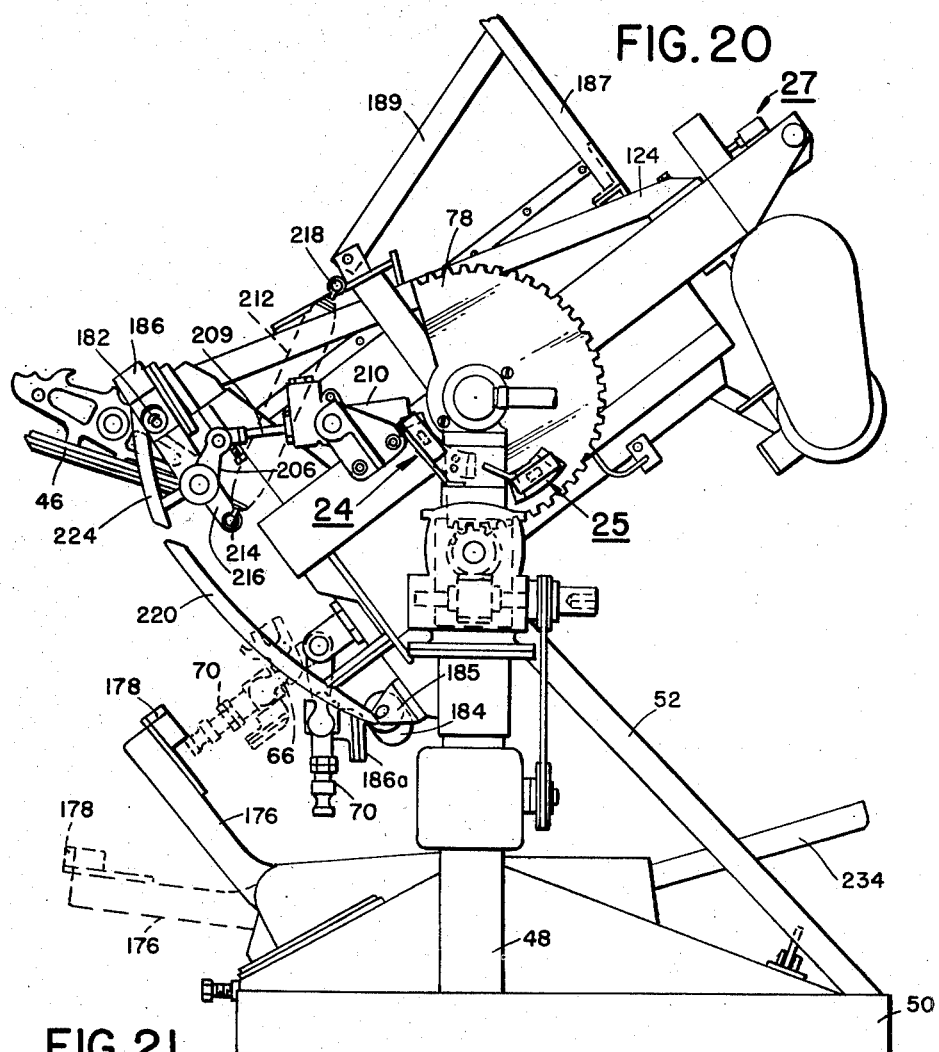
Figure 21:
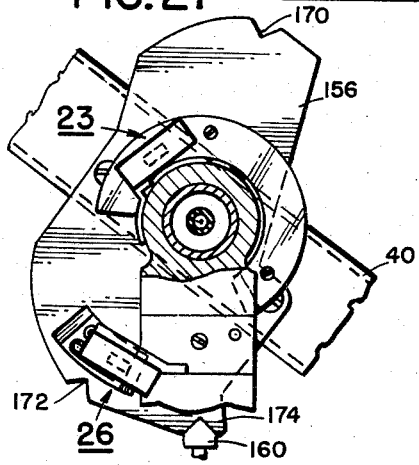
Figure 34:
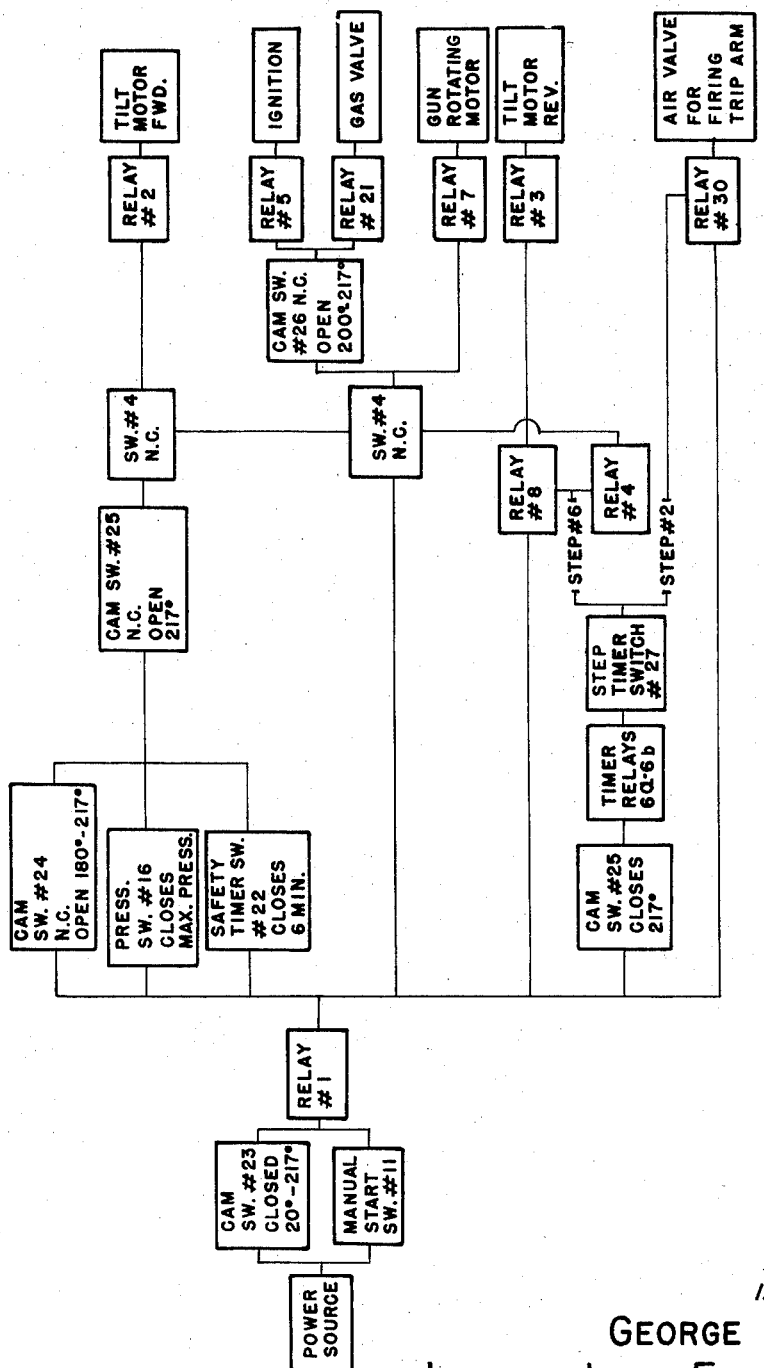

Fig. 9 illustrating how the switch has been closed by the cam;

Fig. 11 is a sectional view taken along line 11—11 of Fig. 9 to illustrate the construction of the switch;

Fig. 12 is a view taken from the rear end of the puffing gun and having certain portions removed to illustrate features of construction;

Fig. 13 is an enlarged vertical sectional view taken through the rear end of the puffing gun to illustrate the construction of the driving gear and attached cam;

Fig. 14 is a front elevation showing the discharge end of the puffing gun in processing position;

Fig. 15 is a side elevation of the puffing gun showing it in firing position but just before it is fired;

Fig. 16 is a sectional view taken along line 16—16 of Fig. 15 showing the switch;

Fig. 17 is a sectional view taken along line 17—17 of Fig. 15 illustrating the details of the switch;

Fig. 18 is a perspective view of switch 25 having portions broken away to show the interior;

Fig. 19 is a sectional view taken along line 19—19 of Fig. 15 and showing the action of the tripping cam in opening the puffing gun;

Fig. 20 is a side elevation illustrating the puffing gun after it has been fired;

Fig. 21 is a detailed side elevation from the opposite side of the gun illustrating the relative positions of the cams and switches;

Fig. 22 is a sectional view taken through the base of the machine showing the details of the linkage which operates the tripping arm;

Fig. 23 is another view of the linkage of Fig. 22 showing the tripping arm in tripping position;

Fig. 24 is another view of Fig. 22 showing the tripping arm in tripping position as placed there by manual operation;

Fig. 25 is a detailed perspective view of a portion of the linkage which enables operating the tripping arm manually;

Fig. 26 is a sectional view taken along line 26—26 of Fig. 24 illustrating the latch for holding the tripping arm linkage in tripping position;

Fig. 27 is a sectional view taken through the tripping arm-operating cylinder and its controlling air valve;

Fig. 28 is a side elevational view showing the puffing gun just after it has been fired and the cover has recoiled;

Fig. 29 is a detailed illustration of the rear end of the puffing gun taken along line 29—29 of Fig. 28 and illustrating the switch operated by the cam which rotates with the gun barrel;

Fig. 30 is a sectional view taken along line 30—30 of Fig. 28 illustrating the gearing for tilting the firing gun;

Fig. 31 is a plan view showing the details of the shock absorbing bumper for the cover of the puffing gun;

Fig. 32 is a front elevation showing the details of the shock absorbinng bumper;

Fig. 33 is a side elevation showing the details of the shock absorbing bumper;

Fig. 34 is a schematic diagram shown to teach in a simple manner the details of wiring the electrical circuits for the puffing gun; and Fig. 35 is the wiring diagram for the puffing gun electrical system.

In the preferred construction embodying the principles of the invention, the materials to be puffed, such as cereal grains or prepared cereal pellets, are heated under pressure in a mechanism which is commonly referred to as a "puffing gun." The products to be puffed may be various starch cell products but the mechanism shown is primarily used with cereal grains or cooked cereal products formed into small size pellets having a certain moisture content. The gun in which the product is treated has a pressure chamber which is cylindrical in shape and resembles a gun barrel shown at 38 in Figs. 5 and 8. The barrel is mounted to rotate about its longitudinal axis within an insulating enclosure shell 39 as is shown in Fig. 6. A pair of channel irons 40 and 41 extend the length of the gun barrel enclosure and form the main part of the frame. Brackets 42 secured to the side of the insulating enclosure are secured to channel irons to support the enclosure shell. Trunnions 43 and 44 are secured at the balance point of the tilting carriage assembly on the frame channel irons and permit the gun supporting framework to tilt about the horizontal trunnion axis to tilt the gun to various operating positions.

The trunnions are pivotally mounted in bearings 45 and 47 secured on the upper end of vertical standards 48 and 49 which are mounted at their bottom ends in a base 50, and which are braced in an upright position by tubular members 52. The trunnions have hollow centers for leading in wires and pipes which are not disturbed when the gun tilts on its trunnions.

The interior of the barrel 38 is cyclindrically shaped and is closed at one end, having an opening on the other end which is closed by a cover or lid 46. The lid seals the interior of the gun barrel to form a pressure chamber in which the cereal is heated under pressure.

The lid or cover 46 of the gun is supported on a yoke 54, Figs. 5 and 14, which is comprised of a pair of arms 56 and 58 hingedly connected at one end to the barrel. The hinged connection consists of a bracket 60 secured to the barrel and having the arms 56 and 58 on either side with a bolt 62 extending through the two arms and through a hole in the bracket. A compression spring 64 is positioned between one of the arms and a nut on the bolt 62 to draw the arms tightly against the bracket causing friction therebetween. This friction serves to hold the cover in any position in which it is swung with respect to the gun barrel. The spring 64 is preferably quite heavy so as to cause a strong frictional resistance between the arms and the bracket so that the cover will remain open and not bounce closed after the gun is fired. The beams 56 and 58 have on their other end toggle seats 64 adapted to receive the rounded end of the spaced toggle arms 66 which are rotatable about pins 68 extending from a latch lever 70. The latch lever is pivotally mounted in a bracket 72 at the side of the gun barrel by a bolt 73 extending through holes in the bracket and the end of the lever. A spring 75 is compressed between a nut on the bolt and the trip lever to increase the friction and prevent the latch from swinging freely after the gun is fired.

The lid or cover 46, as is shown in Fig. 5, is in tightly closed position and has an annular flange 74 around the outer edge which seats against gasket material 76 in the end of the barrel to form a tight seal. The puffing gun, as shown in loading position in Fig. 1, is tilted back with the opening facing reearwardly and upwardly. The cover 46 is open and the cereal grains to be puffel are placed in the gun barrel or pressure chamber. The gun is then closed by closing the cover over the opening and locking it in that position by seating the toggle links 66 in the seat 64. This is done by pulling the latch 70 toward the center of the gun.

It should be mentioned that the gun may be loaded in any position which is convenient. It is also to be understood that the cover may be locked in closed position by any suitable releasable holding means and the claims are not to be limited to covering only a latch.

With the gun thus loaded, it is tilted counterclockwise as shown in Fig. 1 to the horizontal pressurizing position of Figs. 5 and 8.

A large segment gear 78 is mounted on the trunnion 43 for purposes of tilting the gun. A pinion gear 80, Figs. 1, 8, 14 and 30, meshes with the gear and is carried on a short shaft 82 which carries a worm gear 84 driven by worm pinion 86 which in turn is carried on the shaft 88. Shaft 88 carries a pulley 90 driven by belt 92 which is driven by pulley 94 on the tilting motor 96. This tilting motor is suitably secured on the standard 48.

After the gun is tilted to the pressurizing or processing position, the cereal within the puffing gun chamber is heated and as steam is created it forms an increasing pressure in the chamber. When the pressure within the chamber reaches a certain point, the gun is tilted to firing position and suddenly vented to atmosphere by the opening of the cover causing the cereal grains to puff. The pressure at which the gun begins to tilt to firing position is slightly less than the optimum firing pressure because the pressure within the gun will reach this optimum pressure by the time the gun has tilted to firing position and the gun lid is opened.

To heat the chamber and build up the pressure a longitudinal gas burner 98, Figs. 5 and 8, is provided extending the length of the gun barrel. This burner is mounted on a support 99 suspended from the gun barrel enclosure 39 and supplies gas to a combustion chamber beneath the puffing gun. Gas is fed to the burner through a pipe 100 which leads through the hollow trunnion 43 as shown in Figs. 2 and 8. A revolving joint 101 connects to another gas supply pipe 103 which connects to a gas supply. A solenoid control valve 105, operated by relay 21, turns the burner on and off.

To ignite the gas a spark plug 102 is positioned beside the combustion chamber. The plug is fed electricity to ignite the mixture of gas by an electrical lead 104. This lead wire is led in through the hollow trunnion 42 and connects to a source of electricity through a relay switch 5, shown in the circuit diagram. Relay switch 5 could be changed to a time delay switch which would turn off the ignition after a certain time and after the burner is ignited.

The preferred method of heating the pressure chamber is by a gas burner applied to the outer surface, as described, because of the advantages of quick heat, ease of moisture control, and other advantages previously discussed. It is to be understood that the invention is not to be limited solely to use with this method of applying heat.

To prevent the puffing gun barrel from being unevenly heated and to prevent the cereal grains within from being unevenly heated and burned, the barrel is continually rotated about its axis to tumble the grains. To permit this rotation the barrel is rotatably supported on its upper end, Fig. 14, by a bearing ring 106 which extends annularly around the gun barrel and which rides on a pair of supporting rollers 108 and 110 rotatably journaled on bosses which extend from plates 112 and 114. The plates are suitably attached to the channel irons and strengthened by other suitable framework which tilts with the puffing gun assembly. To prevent the barrel from being dislodged from the rollers 108 and 110 when firing and when tilted to loading position, a plate 116 is secured above the barrel opposite the bearing ring 106 and has an arcuate surface 118 closely spaced to the ring.

To support the gun barrel at its rear end, a shaft 120 extends axially from the rear of the gun barrel and is supported for rotation. A bearing support 122, Fig. 5, is secured at its ends to the channel irons 40 and 41, and the support holds a retainer 126 which contains roller bearings 128 in which the shaft 120 rotates. Framework, such as a truss rod 124 shown more clearly in Figs. 1, 15 and 20, strengthens the frame assembly. Secured to the outer end of the shaft is a worm gear 130, which is rotated, Fig. 8, by a pinion gear 132 to rotate the puffing gun barrel. The pinion gear is rotated on a shaft 134 on which is mounted a pulley 136 driven by a belt 138 which is in turn driven by pulley 140 on the gun-rotating motor 142. The motor has a magnetic brake 143 to stop rotation of the barrel when the motor is stopped.

An axial bore 144 extends through the shaft 120 leading to the interior of the puffing gun, Figs. 5, 8 and 13. To this bore is connected a pipe 148 which leads to a pressure gauge for registering the pressure within the drum. The pipe 148 is connected to the bore by a coupling 150 which permits the drum to rotate and the pipe 148 to be stationary. The pipe 148 leads from the rear end of the pressure gun barrel along the barrel and outward through a pipe 149 to the pressure gauge 152, the pipe 149 extending through the hollow trunnion 44.

The extension 149 from the pressure pipe 148 also leads downwardly to a pipe 154 to a pressure responsive switch 16 which is actuated at a certain predetermined pressure to activate tilting motor 96 to cause the gun to be tilted to firing position.

It is to be understood that the gun is tilted to firing position to automatically fire preferably in response to the attainment of a certain pressure within the gun but the mechanism can be changed to fire upon attainment of other specified conditions, such as a certain temperature, by replacing the pressure responsive switch with a device responsive to other conditions.

To move to firing position, the gun tilts counterclockwise as is shown in Figs. 5 and 15 to move to the position of Fig. 15 where the opening of the gun is facing downwardly for discharging the contents.

Thus it will be seen that the gun has three operating positions. The first position shown in Fig. 1 is the load position; the second position shown in Figs. 5 and 8 is the pressurizing or processing position where the contents are heated and the pressure is built up; and the final position is the firing position shown in Figs. 15, 20 and 28. The gun is tilted to these positions by the intermittent operation of the tilt motor. To secure the gun in each of these operating positions so that it will not become shocked or jarred out of position, a plate 156, Fig. 8, is secured to the side frame channel iron 41 to tilt with the gun barrel. This plate has notches cut in the outer peripheral edge into which drops a dog 160 which locks the gun in position. The dog is mounted on a pin 162 which is slidable in a U-shaped bracket 164 secured to the standard 49. A coil compression spring 166, compressed between the lower arm of bracket and a pin 168 which extends through the pin 162, urges the dog upwardly into the notches.

When the gun is in the load position as shown in Fig. 1, it is held there by the dog 160 dropping into the notch 170, as is shown in Fig. 2. When the gun is in the heating or pressurizing position, the dog 160 drops into the notch 172, as shown by Fig. 9. When the gun is in the firing position, the dog 160 drops into the notch 174, as shown by Fig. 21. Thus it should be recognized that Figs. 2, 9 and 21 illustrate the plate 156 in the same positions as is the gun in the corresponding Figs. 1, 8 and 20.

It will be recognized that some of the advantages of the invention can be used if certain functions are performed with the gun in different positions from those shown. Firing, for example, is done most advantageously with the opening facing downwardly but a forced purge of the chamber could be used in different positions. Further, in some adaptations different operations might occur in the same position.

When the gun is tilted from the pressurizing position where the barrel is horizontal, and reaches the firing position of Fig. 15, it is still being rotated by the rotating motor. This keeps the cereal grains tumbling within the pressure chamber to prevent them from being locally overheated and also works them toward the discharge opening of the gun barrel. This also prevents individual cereal grains from sticking to each other as they might if not kept constantly tumbling. When the gun has reached the discharge position as shown in Figs. 15 and 20, the gun barrel rotates for a couple more revolutions to completely work the cereal toward the discharge end and against the cover. Then the latch is tripped to permit the cover to fly open and suddenly vent the contents to atmospheric pressure. During the time the latch is tripped and the cover is opened the puffing gun barrel continues its rotation.

To trip the latch 70 a trip arm 176 swings up from the dotted line position of Fig. 15 to the solid line position. The trip arm carries a trip release cam 178 at its outer end which engages the knob 180 at the end of the latch arm 70. This cams the latch outwardly away from the gun barrel and pivots the toggle links 66 out of their seat on the arms of the container cover to release the cover. The trip arm 176 pivots upwardly to tripping position before the knob 180 reaches it. With the trip arm thus in position, the knob 180 is carried around as the gun barrel rotates, against the cam surface 178a, as shown in Fig. 19. The knob on the latch arm, moving from the dotted line position of Fig. 19 to the solid line position of Fig. 19, is cammed outwardly and, as it rides along the cam surface 178a, the latch is thus unlatched to release the cover.

When tripped, the latch arm flies down against a bumper bar 184, Fig. 20, moving from the dotted line position to the solid line position. A shoe 186a on the latch arm strikes the bumper and the bumper absorbs the force of the trip arm. The bumper 184 is made of resilient material and is mounted between brackets 185 which are suitably mounted on the framework carried by the channel irons. The bumper extends concentric with the gun barrel, as shown in Fig. 14, so that the latch arm need not strike it at its exact center for the shoe to strike it squarely. The bumper, being resilient, will generally cause the latch arm to rebound back to the solid line position of Fig. 28 where it is held by the friction of its hinged mounting on the gun barrel. This friction holds the latch preventing it from bouncing back and forth and interfering with the continued rotation of the firing gun after the cover has been opened.

The release of the latch arm is immediately accompanied by the violent opening of the cover due to the force of the pressure from inside the gun and the discharge of the contents. The operator is protected from the force of the firing by a shield 187 suitably mounted on the tilting framework and given support by a strut 189, Figs. 14 and 20. The cover, as it flies back, has considerable impact due to the pressure on the face and due to its weight. This impact is received by the bar 182 and is absorbed by the shock absorber 210. The bar 182 carries a heavy bumper roll 183 of resilient material, as shown in detail in Figs. 14, 31, 32 and 33. The roll 183 extends arcuately between the ends of a U-shaped holding member 186 which has extensions 188 and 190 on its end carrying trunnion pins 192 and 194 which permit pivotal movement of the bar 186 carrying the bumper. A pair of triangular plates 196 and 198 are secured across the back of the U-shaped member to lend strength thereto and to lend support to the curved rubber roll 183.

The trunnions 192 and 194 are pivotally mounted in rigid supports 200 and 202 which are secured to the framework of the gun. The trunnions carry on their outer ends crank arms 206 and 208 bifurcated at their outer ends to be pinned to a piston rod 209 which carries at its end a piston reciprocable in a cylinder 210. This shock absorbing cylinder 210 absorbs the force of the cover striking the bumper roll and permits the bumper and its assembly to swing back as the cover strikes it to move from the position shown in Fig. 15 to that shown in Fig. 20. The cylinder 210 is a shock-absorber type, permitting oil to leak slowly past the piston to absorb heavy shock. The details of such a conventional cylinder are generally known and will not be described here.

To return the shock-absorbing bumper to its normal position of Fig. 15, a pair of springs 212 is secured between pins 214 extending from extension arms 216 on the trunnions, and a pin 218 on the puffing gun frame. This spring slowly returns the bumper bar to its normal position as the oil leaks from one side of the piston plunger to the other in the shock-absorbing cylinder 210.

As shown in Figs. 14, 15 and 31, a pair of curved guide rods 218 and 220 concentric with the puffing gun extends around from the ends of the lower bumper 184. These rods guide the cover and the latch arm, preventing them from catching on the other mechanism as the gun barrel rotates after having fired. To guide the cover or latch outwardly an dprevent them from catching on the end of rod 218 as the gun rotates counterclockwise in Fig. 14, a rod 222 is provided which extends further forward than rod 218, as is shown in Fig. 31. The rod 222 is welded to the member 186 and is further supported by an attached arm 226 welded to the arm 208. The rod 220 extends further outwardly than the rod 224, Fig. 31, to guide the cover outwardly from the shock absorbing roll and prevent it from catching. The rod 224 has a support formed by a short connected bar 226 welded to the crank 206.

When the gun is fired and the cover blown open, the cereal grains therein are violently ejected by the expansion of pressure within the pressure chamber. The cover, after striking the shock-absorbing bumper 183, rebounds slightly to the position shown in Fig. 28. The latch arm 70 and the cover 46 stay in the position, extending outwardly to be out of the way of the puffed cereal grains which are being expelled from the puffing gun and will not catch on the stationary mechanism as they rotate within the gun barrel. After the cover flies open, the puffing gun continues to rotate for a number of revolutions. This continues the tumbling of the puffed cereal grains and insures that they will fall from the puffing gun and that none will remain within the gun to be burned from the latent heat of the gun barrel. It also prevents any of them from sticking to the barrel wall for the next cycle. This, of course, insures there will be no scorched or burned cereal grains in the cereal batch and it means that a uniform product will obtained.

The mechanism for operating the tripping arm 176 which unlatched the gun cover is shown in detail in Figs. 22 through 26. The tripping arm 176 is pivotally mounted on a shaft 230 located in the base 50. The tripping arm pivots from the non-tripping position shown in Fig. 22 to the tripping position shown in Figs. 23 and 24. In automatic operation of the machine, the tripping arm is moved to tripping position by the action of a pneumatic cylinder 232, but the machine can also be tripped manually by operation of a foot lever 234. The tripping arm 176 has a lower arm extension 236 which is pivotally connected to the end of the piston rod 238 of the pneumatic cylinder. The piston rod has attached to its other end a plunger 239 which is slidable in the chamber of the pneumatic piston 232. The piston is pivotally supported on a pin 241 at its upper end. Air lines 240 and 242 lead through ports to the interior of the cylinder 232 to control the movement of the piston rod 238.

When the tripping arm is moved from the non-tripping position of Fig. 22 to the tripping position of Fig. 23, a valve feeds the supply of pressurized air to the line 242 while it vents the line 240 to atmosphere, thereby admitting pressurized air to the chamber of the cylinder above the piston to force it downwardly to the position shown in Fig. 23, thereby pivoting the arm 176 on its shaft 230. The pivotal movement of the arm is limited by the lower arm 236 striking a stop bolt 244 which is adjustably threaded into a casting 246 mounted in the base 50. The valve controlling the air supply to the piston is shown in Fig. 27 and will be described later in the specification.

To return the arm 176 to its non-tripping position, a valve connects line 240 to a supply of pressurized air and vents line 242 to atmosphere to cause an increase in pressure beneath the piston and force it upwardly in the cylinder, drawing the piston rod 238 to the right and pivoting the tripping arm 176 to its returned position. This return movement is limited by the lower arm 236 striking a stop bolt 248 adjustably threaded in a member 250 secured in the base 50.

During manual operation of the puffing gun, the line 240 continues to be connected to pressurized air to hold the tripping lever 176 in the down position.

When the lever is manually raised to the trip position, it is done against this pressure. For manually tripping the firing gun, an arm 252 is pivotally mounted on the shaft 230, Figs. 24 and 25. This arm has a projecting lug 254 which engages the rear side of the arm 236. The lug 254 does not interfere with the movement of the arm when the tripping lever is being actuated automatically by the pneumatic piston. When manually operated, however, the arm 252 is pivoted downwardly and the lug 254 engages the arm 236, pivoting it and raising the trip lever 176 to the tripping position. To pivot arm 252, a connecting link 256 is connected to its end and is also connected to the lower end of arm 258. This arm 258 forms a lower arm of a bell crank 260, the other arm being the foot lever 234 which has a footplate 264.

The operator, for manual non-automatic firing of the gun, steps on the footplate 264 pivoting the bellcrank 260 to the right, thereby pushing the link 256 to the left, as shown in Fig. 24, to move the trip lever 176 to tripping position. The footlever may be locked in the down position by a latch 266 as shown in detail in Fig. 26. The latch has an overhanging lip 268 which extends over the top of the arm 234 to lock the footlever in down position. A coil compression spring 270 is positioned between a lower plate of the base 50 and release arm 272 to urge the latch to locking position. To release the latch, the operator presses his foot against the upper side of release arm 272 which throws the latch to release position. When the footlever is released, the pressurized air acting on the piston forces the trip arm 176 back to normal position and spring 273 carries the manual tripping mechanism back to normal position.

It will readily be seen that with complete failure of electrical power and air pressure the gun can be fired. If the gun is not in firing position it can be tilted manually by applying a crank to the recess 89 in the end of shaft 88, and can be rotated manually by rotating the pulley 136. The cover will be released when the barrel is rotated if the foot lever 234 is locked down by the latch 266.

The valve, and the solenoid which actuates the valve to control the flow of air to the pneumatic piston 232 for automatic operation, are shown in detail in Fig. 27. The valve is a piston valve having a case 274 with a cylindrical base and a piston 276 reciprocal therein. The piston is operated by the plunger 278 of a solenoid 280 which is operated by a suitable switch to which it is connected by leads 282. An anchored tension spring 284 connects the other end of the piston to operate the valve piston when the solenoid is de-energized. An air pressure line connects to the valve cylinder 274 through a port 286. Another port 288 in the cylinder connects to atmosphere. The lines 240 and 242, leading to the ends of the pneumatic cylinder 232, are alternately valved to pressure and to atmosphere by the reciprocation of the valve piston. The details of construction and operation of such a valve are known to the art and will not be described in detail.

The description of the mechanical operation of the puffing gun has been completed. In order to complete the mechanical structure of the gun to make the operation of the gun automatic, an electrical control system is provided. This system is interdependent with the mechanical functions of the machine and both the mechanical and electrical elements mutually contribute to obtain automatic operation. The description of the electrical system is separated from the description of the mechanical elements to make the device more easily understood.

Fig. 34 is a schematic showing of the circuit for completing the electrical circuit to the operating elements. By following this diagram from left to right it will be observed which of the switches must be operated in order to complete a circuit between the power source at the left of the page and the particular operating element at the right of the page.

Fig. 35 is a conventional wiring diagram such as is used in industry to teach the particular placement of relays of switches with respect to the circuits.

Referring now to the two figures, 34 and 35, the successive functions of the elements of the machine during operations will be sequentially discussed. Electricity is fed to the system by leads 290 and 292 which connect to a source of electrical power. The circuit is completed, to be accessible to the relays and switches, by closing of the main control switch 10 of Fig. 35.

The operator first fills the puffing gun barrel with a measured amount of cereal grains and then closes the cover and locks it with the latch. He is then ready to start the automatic puffing operation. To do this he manually pushes button 11 which is the starting switch. As is shown in Fig. 34, this completes the circuit for the coil of relay 1, feeding electricity to the coils and switches shown to the right. The manual push button switch 11 is held down for a brief period of time while the gun begins to tilt and move toward the 180° pressurizing position. As the gun begins this tilting movement, it passes the 20° position where cam switch 23 is closed, holding the circuit between the power source and relay 1 closed. The manual starting switch may then be released.

The mechanical details of this cam switch 23 are shown in Figs. 2, 3 and 10. Fig. 3 shows the switch open with the gun in loading position and Fig. 10 shows it closed with the gun in pressurizing position. The case 294 enclosing the switch mechanism is mounted on the bearing 45 which supports the trunnion 44. The cam 306, which operates the switch, is shown attached to the plate 156.

Details of the switch mechanism within the case are shown in Fig. 3. The switch may be of any suitable type and the preferred type is shown as a micro-switch having a plunger 296 which depresses a movable contact 298 to engage a fixed contact 300 to complete the circuit. To depress the plunger an arm 302 is hinged on the case 294 and carries a roller 304 which is engaged by the cam 306 to swing the arm toward the case and thereby depress the plunger. The cam 306, for causing the depression of the plunger, has an inclined surface 308 which is only a few degrees from the roller 304 when the gun is in the loading position. Thus, as the gun begins to tilt toward the pressurizing position, the roller immediately rides up on the cam to close the switch 23. This switch remains closed throughout the remaining operating positions of the gun barrel to complete the circuit from the power source and make electricity available to the relays and switches. Only after the gun has fired and has automatically rotated back to the reload position does the roller ride off the cam 306. This cuts off the supply of electricity to the relays and switches to stop the operation of the gun.

Returning now to Figs. 34 and 35, the effects of the actuation of relay 1 will be discussed. In Fig. 34, the relays are shown positioned with both their holding coils and their switches in the same circuit. For ease of illustration one square represents both the holding coil and the switch contacts. For example, relay 1 is shown where the closing of manual starting switch 11 will connect it to the power source to actuate its holding coil. The closure of switch 11 will also feed electricity to the switch of relay 1 and when its contacts close they will complete the circuit from the power source to the mechanism shown in the squares to the right.

To the right on the diagram of Fig. 34 are shown the operating mechanisms, beginning with the tilting motor forward and reading down through the ignition, gas valve, gun rotating motor, tilt motor reverse, and air valve for operating the trip arm. Just to the left of each of the squares indicating these operating mechanisms are the relays which have switches controlling these devices. In order for these relays to operate, all the switches along the horizontal line leading back to the power source must be closed. If all are closed, this will actuate the relay and also furnish power to the relay switch.

The closing of the switch of relay 1 makes electrical power available to switches 24, 16 and 22, as shown in the squares of Fig. 34. The only one of these switches which is closed at the beginning of operation when the gun is in the loading position at a 17° angle, is cam switch 24 which is a normally closed switch. Thus, following the chart from left to right, a circuit is completed from the power source, through cam switch 23, through relay switch 1, through cam switch 24, and through cam switch 25 which is also normally closed. Following the chart to the right, switch 4 is also normally closed. This completes the circuit to relay 2 which closes to start the tilting motor in a forward direction. As is shown in the detailed diagram of Fig. 35, the tilting motor 96 is controlled by triple contact switches 2 and 3. Switches 2 are so located in the circuit as to operate the motor in a forward direction and are controlled by relay 2. Both the tilt motor 96 and the rotational motor 142 are connected to the leads 290 and 292 leading to the source of electricity. The legend, showing how the various electrical elements are illustrated on the circuit diagram, is given in the upper left hand corner of Fig. 35.

Turning now to Figs. 34 and 35, the closing of the switch of relay 1 also makes electricity available to switch 4, as is shown by the horizontal line just below relay 1 in Fig. 34. Switch 4 is normally closed and is not actuated to be open by its relay 4 at the beginning of the cycle of operation and therefore completes the electrical circuit making electricity available to cam switch 26 and to relay 7. Relay 7 immediately closes to start operation of the gun rotating motor. Thus relays 2 and 5 are actuated at the beginning of the cycle and the tilting operation and the rotation of the gun barrel begin immediately. Switches for operating the rotational motor in Fig. 35 are shown at 7 and complete the circuit between the motor and the leads 290 and 292.

Returning to cam switch 26, this switch is normally closed and is not opened until the gun barrel reaches 200°, as indicated by the legend in the square of Fig. 34. This switch then immediately makes electricity available to relay 5 and relay 21 which close their switches to supply electricity to the ignition to open the gas valve, thereby igniting the burner beneath the puffing gun barrel.

Closing of relay switch 1 also makes electricity available to relay 8. The coil of this relay is dependent for actuation upon the step relay switch 27 which has not yet been actuated. Therefore, the relay switch 8 remains open so that the circuit is not completed to relay 3.

Moving down to the next horizontal line of Fig. 34, cam switch 25 is open at this position of the gun barrel and therefore does not complete the circuit to the timer of relays and the step relay switch. It will be noted that cam switch 25 has two contacts, one normally open and one normally closed.

Passing down to the next horizontal line and following it to the right, relay 30 has not been actuated by the step relay switch as indicated by the vertical line leading to it and, therefore, the switch is not closed.

These circuits, just described, have been dependent upon the cam switches 24, 25, and 26 being closed. These switches, similar to switch 23, are operated by cams which rotate with the tilting of the puffing gun barrel.

The mechanism of switch 24 is shown in Figs. 15 and 16. The case for this switch is shown at 308 supported on a bracket 309 which is mounted on the vertical standard 48. The switch is similar in construction to switch 23, except that it is a double-throw switch wired normally closed. The switch has a plunger 310 which is depressible to move the flexible contact 312 away from a fixed contact 314. In normal position, when the plunger is not depressed, flexible contact 312 engages the fixed contact 314 to complete the circuit between the leads 318 and 320. A plunger depressing arm 322 is hingedly mounted on the case 308 and carries a roller 324 which is engaged by the cam 326. The cam is suitably secured to the segment gear 78 by screws 328. Switch 24, enclosed by casing 308, is also shown in Figs. 1 and 5 with the puffing gun barrel in the loading position and in the horizontal pressurizing position, the switch not being depressed in the loading position and depressed in the horizontal position.

Switch 25 is shown in detail in Figs. 15, 17 and 18. This switch is enclosed in a casing 330 which is supported on a bracket 332 secured to the vertical standard 48. A cam 334 is mounted on the segment gear 78 and rotates therewith to depress the switch when the gun is in the firing position. The mounting of the plate 334 to the gear is shown in detail in Fig. 7. This cam plate has the same mounting to its supporting member as do the other switch cam plates and, therefore, only this plate will be described. The plate 334 has arcuate slots 336 and 338 which are countersunk to receive screws 340 and 342 which are threaded into the supporting members 78. The arcuate slots make it possible to adjust the angular position of the cam plate with respect to its supporting member to control the time when the switch will be depressed with respect to the angle of barrel tilt. The cam plate 334 has a beveled edge 342 so that the roller on the switch will easily roll up on the cam surface.

Returning now to the switch 25 and the details of the switch construction, casing 330, Figs. 17 and 18, supports the switch operating mechanism which is a double throw switch. The switch shown with the plunger 344 depressed in Figs. 17 and 18 has a movable contact 346 which engages a fixed contact 348 in normal position when the plunger is not depressed thereby completing the current between leads 350 and 352. Movable contact 346 engages fixed contact 356 when the plunger is depressed to complete the circuit between leads 350 and 358. Arm 362 is hingedly mounted to the case and carries a roller 364 which is engaged by the cam 334 to depress the plunger 360. This plunger is depressed when the gun is in the firing position at 217° and, therefore, the switch 25 which is shown in the square at the top of Fig. 34, remains closed until 217° and the other switch 25, which is shown in the lower portion of Fig. 34, remains open until 217° is reached.

Switch 26 is illustrated in Figs. 2, 4, 9 and 11 as being enclosed in a case 368 which is supported by a bracket 370 mounted on the standard 49. Fig. 11 differs from Fig. 4 only in that it shows the cam approaching the switch to depress it when the gun is tilted to 200°. The detailed construction of the switch is shown in Fig. 4 as having a fixed contact 372 and a movable contact 374, this switch being normally closed and the leads connected to those two contacts. The flexible contact is engaged by a plunger 376 which is operated by an arm hingedly mounted on the case 368. The arm carries a roller 378, the roller being engaged by the cam 380 to depress the plunger and open the switch. The position of the cam 380, as it is carried on the plate 156, is shown in Fig. 2. Cam 380 is secured to a plate 156 in a manner similar to the cam plate in Fig. 7.

Referring back to Figs. 34 and 35, as the gun barrel is tilted by the operation of the tilt motor, it reaches the 180° position. At this point cam switch 24, which is normally closed, is opened to break the circuit between the relay switch 1 and relay 2 to stop the operation of the tilt motor, thus halting the gun at the 180° position. None of the other switches are closed at this position so the puffing gun continues to rotate and the gas burner continues its heating of the drum. While the gun is being heated at this position, the pressure is building up within the puffing gun barrel.

The remark should be again made that the angular positions of the barrel for loading, processing and firing are recommended positions and the operations may be performed in other positions without departing from the invention. To tilt the gun to the 217° or firing position switch 16 actuates relay 2. Switch 16 is a pressure switch which is responsive to the pressure within the puffing gun. This switch is set to be operative at a certain predetermined pressure. The optimum pressure to which the cereal in the chamber is to be subjected can readily be obtained by experimentation and this pressure set on the switch 16. As was previously discussed, a switch responsive to other conditions may be used in some instances. At the closure of switch 16 the circuit is again completed to the relay 2 which operates the tilting motor in a forward direction. The tilting motor begins operation and tilts the puffing gun from the 180° position to the 217° firing position.

As the puffing gun passes the 200° position, cam switch 26, which is normally closed, opens. This breaks the circuit to relays 5 and 21 thereby shutting off the gas valve and turning off the flame beneath the gun barrel.

When the 217° position is reached, cam switch 25 is actuated which has two contacts, one normally closed and one normally open. This opens the normally closed contacts and breaks the circuit to the tilting motor, halting the gun barrel at that position. This also closes the normally opened switch and completes the circuit to the timer relay 6a and 6b to start the step relay switch 27 in operation. This step switch closes the open circuit with each step or index of the switch. The switch is caused to index with each closing of the activating unit of the switch which is mounted at the rear end of the puffing gun barrel.

The physical structure of this activating unit of the switch 27 is illustrated in Figs. 12, 13 and 29. A flat circular plate 382 is secured by bolts 384 to the gear 130, as shown in Fig. 13, and thus rotates with the gun barrel. The bolts 384 extend through arcuate slots 386 in the plate 382, as shown in Fig. 12, and adjustably secure the plate to the gear in turn with a rotation of the puffing gun. Secured to the edge of the plate is a cam plate 388 which extends over an arc of 90° to hold the switch closed for that period of rotation of the gun barrel. This cam engages the switch 27 to close it each time the puffing gun makes the revolution.

A pointer finger 390 is suitably secured to the coupling 150 extending from the rear end of the shaft supporting the gun. This finger is stationary with respect to the rotating puffing gun and is used for indicating the adjustment of cam 388 with respect to the switch.

The activating portion or portion of the switch 27 which closes the circuits, shown in Figs. 34 and 35, is mounted on a framepiece 392, Fig. 29, and has a fixed contact 394 and a movable contact 396 to which leads are connected. The movable contact is actuated by a plunger 398 which is operated by an arm 400 hingedly mounted on the case 401 which supports the switch. The arm carries a roller 402 which rides over the cam 388 to operate the switch each time the puffing gun barrel makes a revolution.

The stepping switch, having an actuating portion and having circuit control contacts, is of the well known commercial type and is shown diagrammatically in Fig. 35, with the movable contact indicated at 404. The movable contact steps along the fixed contacts 406. As it reaches the second contact 408, it completes the circuit through the relay 30 which operates the switch controlling the air valve for operating the pneumatic cylinder for the firing trip arm. Therefore, when the step timer switch reaches the second step, or when the firing gun has made two revolutions after the gun has reached the firing position, the gun is fired. The firing trip arm is moved to the tripping position and is struck by the latch arm as it rotates. This releases the cover to fire the gun. Since the circuit is still complete to the gun rotating motor, the gun continues to rotate and tumble the materials to prevent any of the grains of puffed cereal from resting in one spot and burning to the surface of the barrel.

The gun rotates another four revolutions to completely purge the barrel of puffed cereal grains. As the step switch continues to index, it reaches the 6th step, indicated at 410 in Fig. 35, which completes the circuit through relays 4 and 8 effecting the stopping of rotation and tilting the gun back to loading position. Relay 8 closes the circuit to relay 3, causing it to operate the tilt motor in the reverse direction. Switches 2 which operate the tilt motor in the forward direction were, of course, previously stopped by the cam switch 25 opening to break the circuit to relay 2.

The reaching of the step relay switch at step 6 also actuates the coil of relay 4 causing it to close its two switches. The two switches of relay 4 are normally closed and complete the circuit, as shown in Fig. 34, to the tilt motor "forward," to the ignition, to the gas valve, and to the gun rotating motor. When the upper switch 4 opens, it assures that the tilt motor "forward" circuit will not close as the gun tilts in reverse to move back to its refill position. If this switch 4 were not placed in the circuit to break the circuit, the tilt motor "forward" circuit would close when the gun passes the 180° position and the cam switch 24 is again closed. The lower switch 4, as shown in Fig. 34, opens the circuit to the ignition and gas valve and assures that their current will not close as the gun tilts through the 200° position and cam switch 26 again closes. The lower switch 4 also stops the rotation of the gun.

The step switch is set to close the circuits at step 2 and step 6 but is adjustable and can be made to actuate on any step. For example, as is shown, it is adjustable so as to close the circuits to relays 4 and 6 on steps 6, 7 or 8. In the preferred embodiment described, the gun tilts back and stops rotating at step 6 or 4 revolutions after it has fired. This is normally sufficient to tumble all of the stray puffed cereal grains from the gun but additional revolutions may be desired. Step 2 has been chosen for the firing to permit two revolutions of the gun barrel after it reaches the firing position to adequately tumble the cereal grains toward the cover end of the gun to expedite discharge of the cereal upon firing.

In addition to the operating switches and relays shown, safety devices are built into the system. For example, in Fig. 34, safety timer switch 22 is shown as closing after 6 minutes. This safety timer switch, if closed, will complete the circuit from relay 1 through to the tilting motor forward. Thus, if pressure switch 16 fails to close at maximum pressure, shortly thereafter safety timer switch 22 will close, causing the gun to tilt to firing position and to fire. The safety timer switch is automatically reset each time the gun is tilted back to refill position. Thus the switch will fire 6 minutes after the cycle is started from the filling position.

The remaining safety devices are not shown in the circuit of Fig. 34 but are shown in the circuit of Fig. 35. These switches include the maximum pressure switch 17. This pressure switch causes the gun to fire when the maximum allowable pressure has been reached within the gun barrel. This pressure switch will normally not be actuated because the pressure switch 16 causes the gun to fire at a much lower pressure. Or, upon failure of that switch, the safety timer switch operates the device. In event of failure of both switches or in the event of reaching this maximum of allowable pressure too quickly due to failure of some operating mechanism, the safety pressure switch 17 will close actuating relays 18, 19 and 20. Relay 18 operates audible and visible alarms which are not shown but which warn the operator that something has gone amiss. Relay 19, shown having two contacts, operates the upper switch 19 shown to the right in the diagram of Fig. 35 along with the lower switch 19 in the same figure, to close the circuit through the relay 30 which operates the firing trip arm. For the operation of this safety device, relay 1 need not be closed and the device will fire the gun no matter which of the other circuits has been put out of order. Relay 20 is also actuated by the extreme pressure switch 17, the relay having four contacts. The first contact, shown to the left in the wiring diagram of Fig. 35, completes the circuit through relay 2 which operates the tilting motor to bring the gun to the complete tilt position to cause it to fire. The second contact to the right, operated by the relay 20, closes the circuit to relays 5, 7 and 21 thereby insuring that the gun will continue rotating and that the ignition and gas valve will continue functioning. It will be noticed that each of these switches bypasses relay 1. The remaining switches 20 operated by the relay 20 are located at the upper end of the step switch and the two contacts, normally closed, break that circuit to prevent relays 4 and 8 from being operated to open the circuits.

In addition to the timer switch 22 and extreme pressure switch 17 which operates the safety devices, there are numerous manual push button switches which can be operated either to tilt the gun, cause it to rotate, or fire it. Manual switch 12, when depressed, will cause the firing arm to raise to tripping position and fire the gun. Manual switch 13 will operate the tilt motor in forward rotation. Manual switch 14 will operate the tilt motor in reverse. Manual switch 15 rotates the firing gun.

In order to be able to quickly refer to the function of the switch in the wiring diagram of Fig. 35, a switch number and function chart follows. The description of the type of switch heads each group, followed by the switch number and its function

*Switches—operations performed*

Relay switches:
1—Completes power source to circuits.
  Completes the holding circuit through its relay coil.
2—Operates tilt motor forward.
3—Operates tilt motor reverse.
4—Holds following circuits open after firing and purging:
  Tilt motor forward.
  Gas and ignition.
  Rotation.
5—Ignition.
6—Stepping relay—holds it in operation and resets.
7—Rotation of gun.
8—Holds following relays closed:
  Tilt motor motor reverse.
  Relay #4.

Manual Switches:
10—Off—On.
11—Start
12—Manual firing.
13—Manual forward tilt.
14—Manual reverse tilt.
15—Manual rotation.

Pressure Switches:
16—Start tilt motor forward from 180° position.
17—Safety—operates relay switches 18, 19 and 20.
18—Alarm—excess pressure.
19—Fire gun—excess pressure.
20—Tilt motor forward rotate.

Cam Switches:
23—Main circuit—closed 20°–217°.
24—Stops tilt motor—N. C.—open 180°–217°.
25—N. O. contact completes circuit to step switch—closed at 217°.
  N. C. contact completes circuit to tilt motor—open 217°.
26—Gas and ignition—N. C.—open 200°–217°.
27—Firing step switch—each revolution of gunbarrel indexes switch:
  Fires gun #2.
  Stops barrel rotation and starts tilt motor reverse—step #6.

Timer Switch:
22—Fires gun after fixed time elapses by tilting gun 217° position.

Thus we have provided a puffing gun which operates automatically to produce a superior puffed cereal food product. The puffed cereal pellets produced will be consistent in size because they receive the same process under exactly duplicated conditions for cycle after cycle.

The gun is designed to continue rotation from the beginning of the time when it is heated until after it is fired and the last puffed cereal grain is removed from the pressure chamber. This tumbles the grains in the puffing gun preventing uneven heating and moves the cereal toward the gun opening for firing. This also insures that none of the grains will become burned from the heat of the chamber wall and also aids in producing a consistent sized puffed cereal. Accomplishing complete purging of the puffed cereal from the gun prevents any puffed grains from remaining in the chamber for the next successive cycle.

The puffing gun, being automatic in operation, requires a minimum amount of attention from an operator and thus the number of guns operated by one operator can be increased and the cost of the product produced substantially reduced. The puffing gun mechanism is simple and rugged in structure and well adapted to use over a long period of time and with low operating cost.

It is to be understood that the principles of this invention may be utilized for treating products other than cereals and that the treatment is not to be restricted to a type where enlargement of the product must result.

We have, in the drawings and specification, presented a detailed disclosure of the preferred embodiment of our invention, but it is to be understood that as the invention is susceptible of modifications, structural changes and various applications of use within the spirit and scope of the invention, we do not intend to limit the invention to the specific form disclosed but intend to cover all modifications, changes and alternative constructions and methods falling within the scope of the principles taught by our invention.

We claim as our invention:

1. A mechanism for puffing cereals comprising a cylindrically shaped pressure chamber in which the cereal product may be heated under pressure, a cover carried on the chamber and sealing an opening on one end, hinge means pivotally securing the cover on the chamber, a latch secured to the chamber and latching the cover in closed position to seal the chamber, means for heating the product while the chamber is sealed to build up a pressure therein, means to rotate the chamber about its longitudinal axis to tumble the product and prevent its uneven heating, means to release said latch while the chamber is rotating, and means responsive to the pressure within the chamber and operably connected to actuate said latch release means to permit the pressure to suddenly open the cover to release the pressure within the oven and puff the cereal when the pressure within the oven has reached a desired limit.

2. An apparatus for puffing cereal grains comprising a cylindrical pressure chamber in which the cereal grains may be heated under a pressurized atmosphere, means for rotating the cylindrical chamber about its longitudinal axis while in a horizontal position to give tumbling motion to the grains therein to prevent their being unevenly heated, means for applying heat to the pressure chamber to heat the grains and increase the pressure within the chamber, a cover closing an opening on one end of the chamber and being hingedly mounted to the chamber, a latch for holding the cover in closed position over the chamber end, means responsive to a predetermined condition within the chamber for automatically effecting movement of the chamber to an inclined position for firing with the opening facing downwardly, said chamber rotating means continuing to rotate the chamber while the gun is being tilted to an inclined position, trip means for releasing the latch when desired conditions have been reached within the pressure chamber and said pressure chamber is in said inclined position, and means for continuing the rotation of the chamber for a predetermined period of time after the cover has swung open on its hinges.

3. An apparatus for puffing the cereals comprising a pressure chamber in which the cereal may be heated under pressure, a cover closing an opening at one end of the pressure chamber, means for moving the cylindrical pressure chamber from filling position to processing position, means for giving rotative movement to the pressure chamber about its longitudinal axis to give movement to the grains therein and prevent uneven heating, means for applying heat to the cereals within the pressure chamber to heat the cereal and increase the pressure within the chamber, means responsive to a change of conditions within the chamber automatically moving the pressure chamber to discharge position upon the attainment of a certain condition within the chamber, means automatically releasing the pressure within the chamber after it reaches discharge position to puff the cereal, and means automatically returning the chamber to filling position after the puffed cereal has been removed from the chamber.

4. A mechanism for puffing cereals comprising a pressure chamber in which cereal grains may be heated in a pressurized atmosphere, means for rotating the pressure chamber about its longitudinal axis to tumble the cereal grains therein preventing uneven heating, means for applying heat to the pressure chamber to heat the cereal therein and increase the pressure within the chamber, means to move the pressure chamber to a horizontal position after filling to heat the cereal grains, means responsive to pressure acting automatically to tilt the chamber to discharge position with its opening downward, means to automatically release the pressure within the chamber to cause puffing of the cereal as the chamber reaches discharge position, and means automatically tilting the chamber back to refill position.

5. A mechanism for puffing cereals comprising a pressure chamber in which cereal grains may be heated under pressure and being tiltable to various operating positions, a cover closing an opening in one end of the pressure chamber, the chamber having its opening facing upwardly in filling position, means tilting the pressure chamber to horizontal position after filling, means for applying heat to the chamber to heat the cereal grains and create a pressure within the chamber, pressure responsive means operatively arranged to automatically tilt the chamber to discharge position with the opening downward when a predetermined pressure has been reached, means for rotating the chamber about its longitudinal axis to tumble the cereal grains preventing uneven heating while the heat is being applied to the chamber, means automatically removing the cover from the chamber to release the grains to atmosphere and puff them, means for continuing the rotation of the chamber after the removal of the cover for a predetermined number of rotations, and means automatically tilting the chamber back to refill position after said number of rotations of the chamber.

6. An apparatus for puffing cereals comprising a closed puffing gun having a barrel in which cereal grains are to be heated under a pressure, means for applying heat to the cereal grains therein, a cover over an opening in the barrel to maintain the pressure therein, a means releasably holding the cover over the opening, means to rotate the barrel to cause the barrel to be evenly heated and to prevent uneven heating of the cereal grains therein, means responsive to conditions within the chamber and operatively adapted to tilt the barrel to discharge position at a predetermined chamber condition, automatic tripping means positioned in the path of said releasable holding means when the barrel is in discharge position to move said holding means and release the cover as the barrel is rotated thereby exposing the cereal grains to atmosphere causing them to puff to larger than their normal size, and means to continue rotation of the barrel after the cover is released to purge the puffed cereal grains from within the chamber.

7. An apparatus for puffing cereals comprising a pressure chamber for heating cereal grains and subjecting to pressure, a cover positioned over an opening in one end of the pressure chamber to seal it, latch means holding the cover in position over the chamber opening, means for applying heat to the chamber to heat the cereal grains therein and increase the pressure within the chamber, pressure responsive means operative at a predetermined pressure to tilt the pressure chamber to discharge position with the opening pointing downwardly, and means responsive to the position of the chamber and being operative when the chamber reaches tilt position to release said latch means to cause the chamber to fire to expose the cereal grains to atmosphere and cause them to puff up to an enlarged size.

8. An apparatus for puffing cereals comprising a pressure chamber in which cereal grains are heated in a pressurized atmosphere, a cover carried on the chamber over an opening at one end of the chamber to close it and being movable away from the chamber to release the pressure therein, a holding means carried on the chamber and holding the cover in closed position while the chamber is being heated, means to apply heat to the material therein and increase the pressure, means to give agitational movement to the chamber preventing uneven heating of the cereal, chamber positioning means responsive to conditions within the chamber being operative at a certain condition to move the chamber from a processing position to a discharge position, and releashing means positioned in the path of the holding means being responsive to the position of the chamber as determined by the positioning means and operable to move to cover releasing position in the path of the holding means after the chamber reaches discharge position, the releasing means being struck by the holding means moving it to release position thereby releasing the cover and exposing the contents of the chamber to atmosphere to enlarge the cereal grains.

9. An apparatus for puffing cereals comprising a cereal puffing gun barrel in which cereal grains are heated under a high pressure, a cover positioned over an opening in one end of the gun barrel to seal the pressure therein, means to apply heat to the barrel to increase the pressure therein, means for rotating the barrel while said heat is being applied to evenly distribute the heat over the surface of the barrel and evenly heat the grains therein, a latch holding the cover over the barrel to maintain the pressure within said barrel, means responsive to the pressure within the chamber and operative at a predetermined pressure to tilt the chamber to discharge poistion with the opening facing downwardly for discharging the contents, a latch releasing means, a pneumatic cylinder operatively associated with the latch releasing means to move said releasing means into the path of the latch which rotates with the barrel, an air valve to control the flow of air to said cylinder and means responsive to the gun barrel position and being operatively associated with said valve to cause a flow of air to operate said cylinder and to move the latch releasing means into the path of the latch when the barrel is in discharge position thereby firing the gun.

10. An apparatus for puffing cereals comprising a pressure chamber rotatable about its longitudinal axis in which cereal grains are heated under pressure, a cover releasably latched over an opening in the pressure chamber, means for applying heat to the pressure chamber to heat the cereal grains therein, pressure responsive means connected with the interior of the chamber operative upon the attainment of a certain pressure within the chamber to terminate the application of heat to the chamber, and means to release the cover while said chamber is rotating to expose the contents to atmospheric pressure.

11. An apparatus for puffing cereals comprising a cylindrical chamber in which cereals may be heated under pressure, a cover over an opening in the pressure chamber, a burner fed by fuel for applying heat to the chamber to heat the cereal grains therein, a valve for controlling the supply of fuel to the burner, pressure responsive means operative upon the attainment of a certain pressure within the chamber to tilt the chamber toward discharge position, means responsive to the position of the chamber and being operative as the chamber moves to discharge position to close the valve controlling the fuel and cease the application of heat to the chamber, and means for opening the cover to release the pressure within the chamber at discharge position.

12. An apparatus for puffing cereal grains comprising a puffing gun barrel in which the cereal grains may be heated under pressure, and having an opening in one end, a cover for closing the open end of the barrel, a burner for applying heat to the barrel to heat the cereal grains therein and increase the pressure within the barrel, means responsive to a predetermined condition in the barrel automatically tilting the barrel to firing position with the opening facing downwardly when the cereal within the barrel has been subjected to sufficient heat and pressure, means to remove the cover from the barrel to cause a sudden release of pressure from the barrel and an expansion of the cereal grains, and means automatically operative in response to movement of the barrel to firing position to turn off the burner before the cover is removed from the barrel.

13. An apparatus for puffing cereal grains comprising an elongated pressure container in which cereal grains are heated under pressure having an opening at one end for admission and discharge of the cereal, a releasable cover positioned over said opening to maintain a pressure within the container, a burner positioned adjacent the container and adapted to apply heat thereto when in operation to heat the cereal grains within the container and increase the pressure therein, means for moving the container to filling position with the opening facing upwardly, means for moving the container to operating position after having been filled and the cover placed over the opening, means responsive to the position of the container operative to automatically ignite the burner as the container is moving to operating position, means giving rotary movement to the container about its elongated axis while the container is moving to operating position, and means to open the cover to suddenly expose the cereal grain to atmosphere after a pressure has been built up in the container.

14. An apparatus for puffing cereals comprising a cylindrically shaped pressure gun for containing cereal grains and heating them under a pressurized atmosphere and having an opening at one end, a cover over the opening to close the gun and movable away from the gun opening, the gun being poistioned with the opening facing upwardly when being filled, means for tilting the gun from filling position to pressurizing position at which the axis of the gun is horizontal, a burner positioned adjacent the cylindrical gun to apply heat to the wall thereof to heat the grain cereals and increase the pressure therein, means for rotating the gun about its longitudinal axis to expose various parts of the gun to the burner to equalize the heating thereof and prevent unequal heating of the cereal grains, and means responsive to the position of the gun and operative to ignite the burner while the gun is moving between filling and operating position.

15. An apparatus for puffing cereal grains comprising a gun in which cereal grains are heated under pressure having an opening at one end, a cover hinged to the gun and positioned over the opening, a latch supported on the gun and holding the cover over the opening, means to rotate the gun about its longitudinal axis to tumble the cereal grains within means for applying heat to the gun to heat the cereal grains within and increase the pressure, and means for firing the gun to expose the cereal to atmospheric pressure and puff it to expand its size including a tripping member positioned in the path of the rotating gun to be struck by the latch to release the cover permitting it to be thrown open by the pressure within the gun.

16. An apparatus for puffing cereal grains comprising a gun containing cereal heated under pressure and having an opening therein, a cover hingedly mounted on the gun and normally positioned over said opening, a latch mounted on the gun and holding the cover over said opening, means to apply heat to the gun to heat the cereal grains within and increase the pressure, means for rotating the gun about its longitudinal axis to equalize the application of heat over the surface of the gun, and a tripping means for striking the latch to release the cover to cause the gun to fire, and means for moving the trip means into the path of the latch, said latch striking the trip means as it rotates with the gun, thereby releasing the latch to release the cover and expose the cereal grains to atmosphere to cause them to puff to several times their normal size.

17. An apparatus for puffing cereal grains comprising a cylindrically shaped pressure chamber open on one end and adapted to have cereal heated therein under a pressure, a cover hingedly attached to the chamber and normally positioned over said opening, a latch for holding said cover over the opening comprising a latch arm hingedly attached to the chamber and a toggle link hingedly attached to the latch arm and adapted to be seated against the cover when in latched position and released by moving the latch arm radially outwardly, means for applying heat to the chamber to heat the contents and increase the pressure therein, means for rotating the chamber about its longitudinal axis to equalize the application of heat, a tripping arm having a cam surface inclined outwardly to engage said latch arm as said latch arm rotates with the chamber and cam said arm outwardly to carry the toggle link off the cover to release it, and means to carry the tripping arm and cam surface into the path of the latch arm, the latch arm rotating with the chamber and striking the cam surface to unlatch the cover and release the chamber contents to atmosphere.

18. An apparatus for puffing cereals comprising a puffing gun in which cereal grains are heated under pressure, a cover positioned over an opening in one end of the puffing gun, means holding the cover over the opening and releasable to fire the gun, means for applying heat to the cereal grains therein and increasing the pressure, means for initiating the operation of the gun, cover release means to trip said holding means to fire the gun, condition responsive means operable when a predetermined condition has been attained within the gun to operate said cover release means, and timing means started by said initiating means and operably connected to operate said cover release means after a predetermined length of time in the event that said condition responsive means has not become operable.

19. An apparatus for puffing cereals comprising a puffing gun chamber for holding cereal grains to be heated in a pressurized atmosphere, a cover latched over an opening in one end of the gun chamber, means for applying heat to the gun chamber to heat the cereal grains within and increase the pressure, means to fire the gun when in firing position by unlatching the cover, pressure responsive means operative at a certain predetermined pressure within the gun chamber to move the gun to firing position to cause the firing of the gun, and a second pressure means operative at a higher pressure than said first pressure means to move the gun to firing position to cause firing of the gun in the event the first pressure means has not become operative.

20. An apparatus for puffing cereals comprising a puffing gun for heating cereal grains therein under pressure and having an opening at one end, a cover hingedly secured to said gun and positioned over said opening, a releasable latch carried by the gun and holding said cover over the opening, means for applying heat to the drum to heat the cereal grains within and increase the pressure, means for rotating the drum to cause an even application of heat and an even heating of the cereal grains within, and cam tripping means movable into the path of the latch, means to move the cam tripping means into the path of the latch to release it and to fire the gun, and means to immediately move the cam out of the way as the tripping means and cover are carried around by the rotating gun.

21. An apparatus for puffing cereals comprising a closed pressure chamber in which cereal may be heated to an optimum pressure to puff the cereal to a desired size when the chamber is opened to atmosphere, an openable lid closing an opening at one end of the chamber, means for heating the chamber in a processing position, means to position the chamber in a discharge position with the opening facing downwardly to discharge the contents, means responsive to the pressure within the chamber and operable at less than said optimum pressure to cause operation of said positioning means causing the chamber to be moved to discharge position, and means to open the lid and expose the contents to atmosphere to puff the cereal, the pressure within the chamber having reached said optimum pressure by the time said opening means is operative.

22. A mechanism for treating a cereal product comprising a chamber in which the product is treated, a cover closing an opening in the chamber, means for increasing the temperature of the product within the chamber, means to move the chamber from a processing position to an emptying position, release means for opening the cover to empty the product from the chamber at emptying position, and means responsive to a predetermined condition within the chamber, said condition responsive means being operatively associated with said moving means and being operative in response to said predetermined condition to operate the moving means to move the chamber to emptying position.

23. The mechanism of claim 22 in which the condition responsive means is responsive to changes in pressure and operates said moving means at a predetermined pressure within the chamber.

24. An apparatus for puffing cereals comprising a pressure chamber rotatable about its longitudinal axis for heating cereal grains, a cover closing an opening in the chamber, release means for opening the cover to remove the contents from the chamber, mechanism for moving the chamber from a processing position to an emptying position while said chamber is rotating, and means automatically operative to cause said release means to open said cover while said chamber is rotating after the chamber is positioned in emptying position.

References Cited in the file of this patent
UNITED STATES PATENTS

| | | |
|---|---|---|
| 1,035,840 | Anderson | Aug. 20, 1912 |
| 1,878,782 | Kirn | Sept. 20, 1932 |
| 2,086,266 | Heue et al. | July 26, 1937 |
| 2,132,987 | Kiewit | Oct. 11, 1938 |
| 2,148,728 | Charnley | Feb. 28, 1939 |
| 2,259,802 | Crosby et al. | Oct. 21, 1941 |
| 2,279,868 | Hayden | Apr. 14, 1942 |
| 2,414,185 | Andrews | Jan. 14, 1947 |
| 2,446,316 | Willis | Aug. 3, 1948 |
| 2,598,242 | Ernest | May 27, 1952 |
| 2,731,904 | Van Arsdell et al. | Jan. 24, 1956 |